United States Patent
Boue et al.

(10) Patent No.: US 11,689,353 B2
(45) Date of Patent: Jun. 27, 2023

(54) TWEAKABLE BLOCK CIPHERS FOR SECURE DATA ENCRYPTION

(71) Applicant: SECURE-IC SAS, Cesson-Sevigne (FR)

(72) Inventors: Théophile Boue, Servon sur Vilaine (FR); Margaux Dugardin, Rennes (FR); Yannick Le Provost, Rennes (FR); Brice Moreau, Bruz (FR)

(73) Assignee: SECURE-IC SAS, Cesson Sevigne (FR)

( * ) Notice: Subject to any disclaimer, the term of this patent is extended or adjusted under 35 U.S.C. 154(b) by 280 days.

(21) Appl. No.: 17/251,154

(22) PCT Filed: Jun. 5, 2019

(86) PCT No.: PCT/EP2019/064613
§ 371 (c)(1),
(2) Date: Dec. 10, 2020

(87) PCT Pub. No.: WO2019/243047
PCT Pub. Date: Dec. 26, 2019

(65) Prior Publication Data
US 2021/0266143 A1    Aug. 26, 2021

(30) Foreign Application Priority Data
Jun. 18, 2018  (EP) .................... 18305754

(51) Int. Cl.
*H04L 9/06*    (2006.01)
*H04L 9/00*    (2022.01)

(52) U.S. Cl.
CPC ............ *H04L 9/0637* (2013.01); *H04L 9/003* (2013.01); *H04L 2209/04* (2013.01)

(58) Field of Classification Search
CPC . H04L 9/00; H04L 9/06; H04L 9/0618; H04L 9/3066; H04L 9/0637; H04L 9/003;
(Continued)

(56) References Cited

U.S. PATENT DOCUMENTS

2011/0211691 A1*  9/2011  Minematsu .......... H04L 9/0618
                                                          380/46
2012/0314857 A1* 12/2012  Minematsu .......... H04L 9/0618
                                                          380/44
(Continued)

OTHER PUBLICATIONS

Jean, et al., "Tweaks and Keys for Block Ciphers: the TWEAKEY Framework", International Conference on the Theory and Application of Cryptology and Information Security, vol. 8874, pp. 274-288, Jan. 31, 2014.
(Continued)

*Primary Examiner* — Abu S Sholeman
(74) *Attorney, Agent, or Firm* — BakerHostetler

(57) ABSTRACT

A block cipher encryption device for encrypting a data unit plaintext into blocks of ciphertexts, the data unit plaintext being assigned a tweak value and being divided into one or more plaintext blocks. The block cipher encryption device comprises: a combinatorial function unit associated with each plaintext block, the combinatorial function unit being configured to determine a tweak block value by applying a combinatorial function between a value derived from the tweak value and a function of a block index assigned to the plaintext block, a first masking unit in association with each plaintext block, the first masking unit being configured to determine a masked value by applying a data masking algorithm to the tweak block value determined by the combinatorial function unit associated with the plaintext block.

14 Claims, 16 Drawing Sheets

(58) Field of Classification Search
CPC ... H04L 2209/04; H04L 9/063; H04L 9/0631; G06F 21/602
See application file for complete search history.

(56) References Cited

U.S. PATENT DOCUMENTS

| | | | | |
|---|---|---|---|---|
| 2015/0200772 | A1* | 7/2015 | Yamada | H04L 9/0637 380/28 |
| 2016/0364343 | A1* | 12/2016 | Case | G06F 12/145 |
| 2017/0054550 | A1* | 2/2017 | Choi | H04L 9/0637 |
| 2017/0104586 | A1 | 4/2017 | Hars | |
| 2017/0364704 | A1* | 12/2017 | Wright | G06F 21/6227 |

OTHER PUBLICATIONS

Granger, et al., "Improved Masking for Tweakable Blockciphers with Applications to Authenticated Encryption", International Conference on Simulation, Modeling, and Programming for Autonomous Robots, pp. 263-293, Apr. 28, 2016.

Rogaway, "Efficient Instantiations of Tweakable Blockciphers and Refinements to Modes OCB and PMAC", Dept. of Computer Science, University of California, Davis, 2004.

Liskov, et al., "Tweakable Block Ciphers", CRYPTO 2002, LNCS, vol. 2442, pp. 21-46, 2002.

Luo, et al., "Side-Channel Power Analysis on XTS-AES", Proceedings of the Design, Automation & Test in Europe Conference & Exhibition, pp. 1330-1335, 2017.

Avanzi, "The QARMA Block Cipher Family—Almost MDS Matrices Over Rings With Zero Divisors, Nearly Symmetric Even-Mansour Constructions With Non-Involutory Central Rounds, and Search Heuristics for Low-Latency S-Boxes", IACR Transactions on Symmetric Cryptology, p. 1-40, 2017.

Hatzidimitriou, et al., "Implementation of a P1619 crypto-core for Shared Storage Media", Melecon 2010-2010 15th IEEE Mediterranean Electrotechnical Conference, pp. 597-601, 2010.

* cited by examiner

TWEAKABLE BLOCK CIPHERS FOR SECURE DATA ENCRYPTION

CROSS-REFERENCE TO RELATED APPLICATIONS

This application is a National Stage of International patent application PCT/EP2019/064613, filed on Jun. 5, 2019, which claims priority to foreign European patent application No. EP 18305754.6, filed on Jun. 18, 2018, the disclosures of which are incorporated by reference in their entirety.

TECHNICAL FIELD

The invention generally relates to encryption/decryption of data stored in sector-addressable storage devices and in particular to tweakable block cipher-based encryption/decryption.

BACKGROUND

Cryptographic systems provide data protection solutions that ensure confidentiality, security, authentication, integrity, and privacy of digital data during its storage in insecure memories and/or transmission over insecure networks.

Embedded devices often carry sensitive information which is to be protected against attacks. To protect such sensitive information, encryption functions are used.

An encryption function is based on an algorithm that encrypts original data, or 'plaintext', using one or more encryption keys. The encryption process results in ciphered data, or 'ciphertext', which can be viewed in its original form only if it is decrypted with the correct key(s).

Encryption algorithms include symmetric and asymmetric algorithms. Symmetric encryption algorithms use the same secret key for encrypting and decrypting data. Exemplary symmetric encryption algorithms comprise the DES and AES algorithms. Asymmetric encryption algorithms use two different keys comprising one public key and one private key. The public key may be shared with different users, but the private key must be kept secret so has to be protected. Exemplary asymmetric encryption algorithms comprise the RSA algorithm.

Data encryption may be a bit-wise encryption or a block-wise encryption. A bit-wise encryption consists in encrypting bits comprised in a plaintext one-by-one. A block-wise encryption consists in dividing plaintext into blocks of bits, where the bits comprised in each block are encrypted concurrently. Exemplary bit-wise encryption algorithms comprise stream ciphers where the plaintext bits are encrypted once at a time, each plaintext bit being combined with a pseudorandom cipher bit stream. Exemplary block-wise encryption algorithms comprise block ciphers that operate on fixed-length blocks of bits, each block having a fixed cipher block length.

Disk encryption is a particular case of data encryption which is implemented to protect data stored in sector-addressable embedded or external storage devices such as hard disks, solid-state drive and tape data storage. Disk encryption ensures confidentiality of stored data by preventing unauthorized access to data storage devices. Disk encryption may be implemented at the hardware and/or the software level.

Disk encryption solutions generally aim at ensuring confidentiality of the data stored on a disk, providing a fast retrieval and storage of data independently on the location where the data is stored on the disk, and providing space-saving encryption such that the amount of storage space used for encrypted data is not larger than the size of original data.

In order to meet these properties (data confidentiality, fast retrieval and storage of data, and space-saving encryption), disk encryption relies on dividing the disk space into several sectors which are encrypted and decrypted independently using block-ciphers.

A disk sector (also referred to as 'a sector' or a 'data unit') represents the minimum storage unit of the storage disk/device and constitutes a fixed amount (usually $2^n$, n being a natural number, e.g. 512 bytes, 2048 bytes, or 4096 bytes) of user-accessible data. To each sector of the disk is assigned a sector address (also referred to as a 'sector number') representing the storage location of the sector within the disk. Each sector is divided into several blocks (also referred to as 'data blocks'), each block being assigned a block index indicating the position of the block within the sector.

As block ciphers are limited to plaintext blocks of a certain cipher block length, block ciphers-based disk encryption uses modes of operations. Modes of operation are rules that enable the expansion of the encryption block size to cover the whole data in the disk sectors and define how to repeatedly apply a block cipher's single block encryption operation to encrypt data of a larger length.

Existing block-ciphers modes of operation comprise non-tweakable modes of operation and tweakable modes of operation. Tweakable modes of operation provide a different processing to each two different sectors.

Exemplary non-tweakable modes of operation comprise the Electronic Codebook mode (ECB), the Cipher Block Chaining mode (CBC), the Propagating Cipher Block Chaining mode (PCBC), the Cipher Feedback mode (CFB), the Output Feedback mode (OFB), and the Counter mode (CTR).

FIG. 1 is a block diagram illustrating the structure of a conventional encryption device implementing the ECB mode of operation. According to such ECB mode of operation, the original plaintext is divided into m+1 plaintext blocks. Each plaintext block P is encrypted separately using a block cipher encryption unit 11-$j$ that uses a key and implements a block cipher to generate a ciphertext block in association with each plaintext block.

FIG. 2 is a block diagram illustrating the structure of a conventional encryption device implementing the CBC mode of operation. According to the CBC mode of operation, each plaintext block P is XORed, before being encrypted by a block cipher encryption unit 21-$j$, with the ciphertext block generated by encrypting the previous plaintext block $P_{j-1}$ in the chain. The first plaintext block $P_0$ is XORed with an initialization vector, a random or a pseudo-random fixed-size input variable required to be unique and unpredictable at encryption time.

FIG. 3 is a block diagram illustrating the structure of a conventional encryption device implementing the CFB mode of operation. According to the CFB mode of operation, each ciphertext block $C_j$ is generated as the output of the exclusive OR (XOR) operation applied to:
- the plaintext block $P_j$ associated with this ciphertext block, and
- to the result of the encryption, by the block cipher encryption unit 31-$j$, of the ciphertext block generated in association with the previous plaintext block $P_{j-1}$ in the chain.

The first ciphertext block is generated as the output of the XOR operation applied to the plaintext block associated with this ciphertext block and to the result of the encryption of an initialization vector.

FIG. 4 is a block diagram illustrating the structure of a conventional encryption device implementing the OFB mode of operation. According to the OFB mode, each ciphertext block $C_j$ is generated as the output of the XOR operation applied to:

- the plaintext block $P_j$ associated with this ciphertext block, and
- to the result of the encryption, by the block cipher encryption unit 41-$j$, of an intermediate ciphertext generated by the previous block cipher encryption unit 41-$j$ in the chain.

The first ciphertext block is generated as the output of the XOR operation applied to the first plaintext block associated with this first ciphertext block and to the result of the encryption of an initialization vector.

In addition to the plaintext and the encryption key, tweakable modes of operation take as input a tweak value that plays the same role as the initialization vectors (for example in the CBC mode of operation). Exemplary tweakable modes of operation comprise:

- the Liskov, Rivest, and Wagner (LRW) modes such as the Tweak Block Chaining (TBC) disclosed in "M. Liskov, R-L. Rivest, and D. Wagner, 'Tweakable Block Ciphers', CRYPTO 2002, LNCS, volume 2442, 2002";
- the XOR-Encrypt-XOR (XEX) mode designed by Rogaway and published in "Rogaway, 'Efficient Instantiations of Tweakable Blockciphers and Refinements to Modes OCB and PMAC', Dept. of Computer Science, University of California, Davis", and
- the tweakable with ciphertext stealing (XTS) mode (also referred to as the 'XTS-AES mode'), standardized in 2007 as IEEE P1619 for the AES block cipher algorithm.

FIG. 5 is a block diagram illustrating the structure of a conventional encryption device implementing the TBC mode of operation. According to the TBC mode of operation, each plaintext block $P_j$ is encrypted into a ciphertext block $C_j$, by a block cipher encryption unit 51-$j$, that uses an encryption key and a tweak value during encryption. An initial tweak value $T_0$ is used for the encryption of the first plaintext block $P_0$. The tweak value used for the encryption of each successive plaintext block corresponds to the ciphertext block generated by the previous block cipher encryption unit 51-($j$−1) in the chain.

The XEX and XTS modes of operation use a tweak value which corresponds to the sector address assigned to the data unit or sector containing data to be encrypted. The XEX mode of operation uses a same encryption key for tweak value encryption and plaintext block encryption. The XTS mode of operation uses two different encryption keys. A first encryption key (also referred to as a 'tweak encryption key') is used to encrypt the tweak value. A second encryption key (also referred to as 'data encryption key') is used for plaintext blocks encryption.

The processing of each single plaintext block according to the XEX and XTS modes is similar and comprises two phases. The first phase aims at generating a tweak block by applying an encryption of the tweak value using a block cipher and the tweak encryption key followed by a combinatorial function (e.g. modular multiplication) over a finite field involving a primitive element over a given finite field and the block index associated with the processed plaintext block. The second phase aims at generating a ciphertext block in association with the processed plaintext block and consists of plaintext block encryption using a block cipher and the data encryption key, where the input and output of the block cipher encryption unit are XORed with the tweak block generated at the first phase. The repetition of the single plaintext block encryption to the remaining plaintext blocks in the chain is defined by the mode of operation.

FIG. 6 is a block diagram illustrating the structure of a conventional encryption device implementing the XEX mode of operation. Accordingly, the tweak encryption unit 61 generates an encrypted tweak value stored in a storage unit 63-0 (e.g. a register). Then, along the chain, successive combinatorial functions (e.g. modular multiplications) over a Galois field are performed by combinatorial function units 65-$j$, each combinatorial function producing a tweak block $T_j$ stored in a storage unit 63-$j$. The encryption device further comprises m+1 block cipher encryption units 67-$j$ for $j=0, \ldots, m$, the $j^{th}$ block cipher encryption unit 67-$j$ being configured to determine a $j^{th}$ intermediate ciphertext block $IC_j$ by encrypting the output of the XOR operation applied to the $j^{th}$ plaintext block $P_j$ and the tweak block $T_j$ stored in the $j^{th}$ storage unit 63-$j$. Then, the $j^{th}$ ciphertext block $C_j$ is determined by applying an XOR operation to the $j^{th}$ intermediate ciphertext block $IC_j$ and the tweak block $T_j$ stored in the $j^{th}$ storage unit 63-$j$.

FIG. 7 is a block diagram illustrating the structure of a conventional encryption device implementing the XTS mode of operation. The XTS mode uses ciphertext stealing to provide support and encryption of data units/sectors with a size that is not divisible by the cipher block-length. In case units/sectors size is divisible by the cipher block length, ciphertext blocks are generated in a similar way as they are being generated by the XEX mode of operation except for tweak and data encryption keys being different. Accordingly, the data unit is divided into m+1 plaintext blocks among which the first m plaintext blocks $P_0, P_1, \ldots, P_{m-1}$ have the cipher block-length (for example 128 bits for the AES block-cipher), and the last plaintext block $P_m$ has a length lower or equal to the cipher block length (for example less than or equal to 128 bits for the AES block-cipher). The (m−2) first ciphertext blocks are generated in a similar way as ciphertext blocks are generated in the XEX mode of operation. The $m^{th}$ ciphertext block $C_m$ is generated from the processing of the $(m-1)^{th}$ plaintext block $P_{m-1}$. The determination of the $(m-1)^{th}$ ciphertext block consists of two processing steps. At a first step, full-length plaintext block $P'_m$ is generated by filling the original $m^{th}$ plaintext block $P_m$ with the last digits of the $m^{th}$ ciphertext block $C_m$ such that the plaintext block $P_m$ is of length equal to the cipher block-length. At a second step, a first XOR operation, a block cipher encryption, and a second XOR operation are applied to the determined full-length plaintext block $P'_m$ and the tweak block stored in the $m^{th}$ storage unit to generate the $(m-1)^{th}$ ciphertext block $C_{m-1}$.

Tweakable operation modes provide stronger data protection and security than non-tweakable modes. The use of the tweak blocks provides an additional security layer and adds a difficulty to malicious parties who plan to recover the tweak blocks and the data encryption key for recovering the original data stored on a protected device. However, recent studies revealed that tweakable modes of operation, in particular the AES-XTS mode, are prone to side-channel attacks. Some power side-channel attacks against the AES-XTS mode use the side-channel information leaked through the modular multiplications for recovering the tweak blocks, as disclosed in "C. Luo, Y. Fei, and A-A. Ding, 'Side-Channel Power Analysis on XTS-AES', In Proceedings of the Design, Automation & Test in Europe Conference & Exhibition, 2017". Such attacks show that in spite of using encrypted tweaks, the XTS-AES mode and in general tweakable modes of operation are still vulnerable to side-channel attacks.

There is accordingly a need for protecting tweakable modes of operation for block ciphers used for data encryption.

SUMMARY

In order to address these and other problems, there is provided a block cipher encryption device for encrypting a data unit plaintext into blocks of ciphertexts, the data unit plaintext being assigned a tweak value and being divided into one or more plaintext blocks. The block cipher encryption device comprises a combinatorial function unit associated with each plaintext block ($P_j$), the combinatorial function unit being configured to determine a tweak block value ($T_j$) by applying a combinatorial function between a value derived from the tweak value and a function of a block index assigned to the plaintext block. The block cipher encryption device further comprises, in association with each plaintext block ($P_j$), a first masking unit configured to determine a masked value $M_j(T_j)$ by applying a data masking algorithm to the tweak block value ($T_j$) determined by the combinatorial function unit associated with the plaintext block.

According to some embodiments, the block cipher encryption device may further comprise:
- a tweak encryption unit configured to determine an encrypted tweak value by encrypting the tweak value using a block cipher and a tweak encryption key, the value derived from the tweak value being given by the encrypted tweak value;
- a first XOR unit configured to determine an intermediate plaintext block ($IP_j$) by applying an XOR operation between the masked value $M_j(T_j)$ and the plaintext block ($P_j$);
- a block cipher encryption unit configured to determine an intermediate ciphertext block ($IC_j$) by encrypting the intermediate plaintext block using the block cipher and a data encryption key;
- a second XOR unit configured to determine a ciphertext block ($C_j$) by applying an XOR operation between the masked value $M_j(T_j)$ and the intermediate ciphertext block ($IC_j$).

According to some embodiments, the tweak block value ($T_j$) may determine by applying a combinatorial function between the encrypted tweak value and a function of a block index assigned to the plaintext block, the function being an exponentiation function represented by a base value and an exponent value, the base value being a primitive element over a given finite field, the exponent value being equal to said block index.

According to some embodiments, the data masking algorithm may be an additive masking algorithm or a multiplicative masking algorithm.

According to some embodiments, the block cipher may implement a block cipher masking algorithm, the block cipher masking algorithm being an additive masking algorithm or a multiplicative masking algorithm.

According to some embodiments, the block cipher applied by the block cipher encryption unit may implement an iterated additive block cipher masking algorithm that performs several masking iterations, a mask value being used at each masking iteration. In such embodiments, the first masking unit may be configured to apply a data masking algorithm that uses as a mask value the mask value implemented by the block cipher encryption unit at the last masking iteration, the block cipher encryption device comprising, in association with each plaintext block ($P_j$):
- a second masking unit configured to apply the data masking algorithm to the masked value determined by the first masking unit, and
- a third masking unit configured to apply the data masking algorithm to the intermediate plaintext block ($IP_j$) before being encrypted by the block cipher encryption unit.

According to some embodiments, in which the block cipher applied by the block cipher encryption unit implements an iterated additive block cipher masking algorithm that performs several masking iterations, a mask value being used at each masking iteration, the first masking unit may be configured to apply a data masking algorithm that uses, as a mask value, an affine function of the mask value implemented by the block cipher encryption unit at the last masking iteration. The block cipher encryption device may further comprise, in association with each plaintext block ($P_j$):
- a second masking unit configured to apply the data masking algorithm to the intermediate plaintext block ($IP_j$) before being encrypted by the block cipher encryption unit;

the affine function being represented by a slope coefficient and a constant value, the slope coefficient being a predefined primitive element over a given finite field, the constant value corresponding to the mask value implemented by the block cipher encryption unit at the last masking iteration of the iterated additive block cipher masking algorithm.

According to some embodiments, the block cipher encryption device may comprise, in association with each plaintext block ($P_j$):
- a second masking unit configured to apply the data masking algorithm to the masked value determined by the first masking unit and corresponding to the mask value implemented by the block cipher encryption unit (86-$j$) and (86-$j$+1), and
- a third masking unit configured to apply the data masking algorithm to the intermediate plaintext block ($IP_j$) before being encrypted by the block cipher encryption unit (86-$j$);
- a fourth masking unit configured to apply the data masking algorithm to the ciphertext block determined by the second XOR unit;

the data masking algorithm being an additive masking algorithm using a predefined mask value selected from a set of predefined mask values.

According to some embodiments, the block cipher encryption device may comprise, in association with each plaintext block ($P_j$):
- a second masking unit configured to apply the data masking algorithm to the intermediate plaintext block ($IP_j$) before being encrypted by the block cipher encryption unit;
- a third masking unit configured to apply the data masking algorithm to the ciphertext block determined by the second XOR unit;

the masking algorithm being an additive masking algorithm using an affine function of a predefined mask value, the affine function being represented by a slope coefficient and a constant value, the slope coefficient being a predefined primitive element over a given finite field, the constant value being a predefined mask value selected from a predefined set of predefined mask values.

According to some embodiments, the block cipher encryption device may comprise, in association with each plaintext block ($P_j$), a second masking unit configured to apply the data masking algorithm to the masked value determined by the first masking unit, the data masking algorithm being a multiplicative masking using predefined invertible mask values.

According to some embodiments, the block cipher may be chosen in a group comprising the AES block cipher, the DES block cipher, the TDEA block cipher, the SEED block cipher, the SM4 block cipher, Camellia block cipher, the Blowfish block cipher, the Simon block cipher, the IDEA block cipher, and the RC5.

According to some embodiments, the block cipher encryption device may be configured to encrypt the data unit plaintext according to a tweakable mode of operation chosen in a group comprising the XEX mode of operation and the XTS mode of operation.

There is also provided a block cipher decryption device for decrypting a data unit ciphertext into blocks of plaintexts, the data unit ciphertext being previously encrypted using the block cipher encryption device according to any preceding feature, the data unit ciphertext being assigned a tweak value and being divided into one or more ciphertext blocks, the block cipher decryption device comprising:
- a combinatorial function unit associated with each ciphertext block ($C_j$), the combinatorial function unit being configured to determine a tweak block value ($T_j$) by applying a combinatorial function between a value derived from the tweak value and a function of a block index assigned to the plaintext block.

The block cipher decryption device comprises, in association with each ciphertext block ($C_j$):
- a masking unit configured to determine a masked value $M_j(T_j)$ by applying a data masking algorithm to the tweak block value ($T_j$) determined by the combinatorial function unit associated with the ciphertext block.

There is also provided a method for encrypting a data unit plaintext into blocks of ciphertexts, the data unit plaintext being assigned a tweak value and being divided into one or more plaintext blocks, the method comprising:
- determining a tweak block value ($T_j$) in association with each plaintext block by applying a combinatorial function between a value derived from the tweak value and a function of a block index assigned to the plaintext block.

The method comprises, in association with each plaintext block ($P_j$), determining a masked value $M_j(T_j)$ by applying a data masking algorithm to the tweak block value ($T_j$) determined in association with the plaintext block.

There is also provided a method for decrypting a data unit ciphertext into blocks of plaintexts, the data unit ciphertext being assigned a tweak value and being divided into one or more ciphertext blocks, the decryption method comprising:
- determining a tweak block value ($T_j$) in association with each ciphertext block ($C_j$) by applying a combinatorial function between a value derived from the tweak value and a function of a block index assigned to the ciphertext block.

The method comprises, in association with each ciphertext block ($C_j$), determining a masked value $M_j(T_j)$ by applying a data masking algorithm to the tweak block value ($T_j$) determined in association with the ciphertext block.

Advantageously, the various embodiments of the invention provide efficient and low cost (particularly in terms of area footprint and power consumption) security mechanisms enabling a partial or an end-to-end masking of data in the encryption/decryption chain, such as masking countermeasures providing protection of tweak blocks and sensitive data against side-channel attacks.

Advantageously, the various embodiments of the disclosure provide a secure XTS operation mode for the AES algorithm. This makes it resistant to attacks that target the tweak block value for gaining knowledge about the cryptosystem.

Advantageously, the various embodiments of the disclosure provide secure tweakable chained modes of operation for block ciphers used in disk encryption/decryption.

BRIEF DESCRIPTION OF DRAWINGS

The accompanying drawings, which are incorporated in and constitute a part of this specification, illustrate various embodiments of the invention.

DETAILED DESCRIPTION

Figure 1:
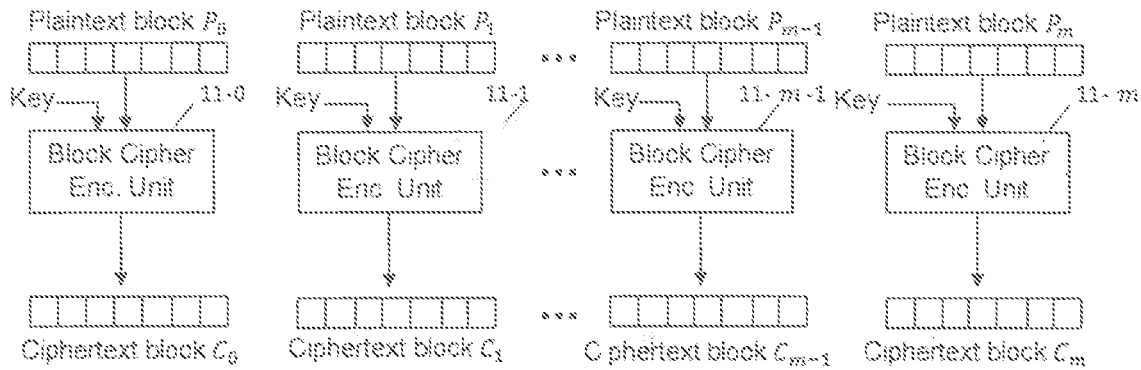
FIG. 1 is a block diagram illustrating the structure of an encryption device implementing the EBC mode of operation of the prior art.
Figure 2:
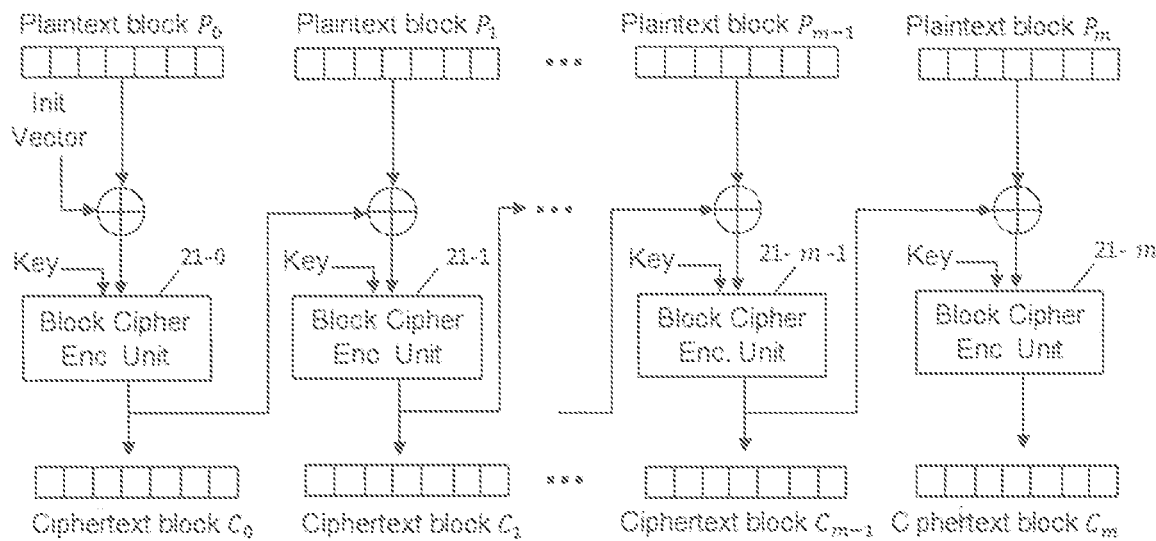
FIG. 2 is a block diagram illustrating the structure of an encryption device implementing the CBC mode of operation of the prior art.
Figure 3:
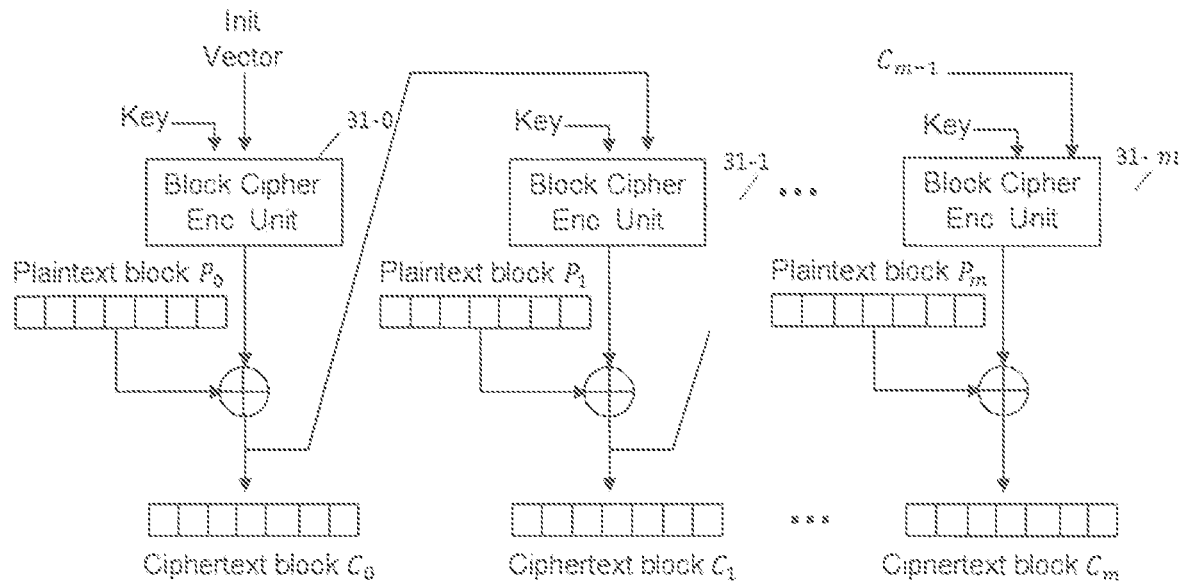
FIG. 3 is a block diagram illustrating the structure of an encryption device implementing the CFB mode of operation of the prior art.
Figure 4:
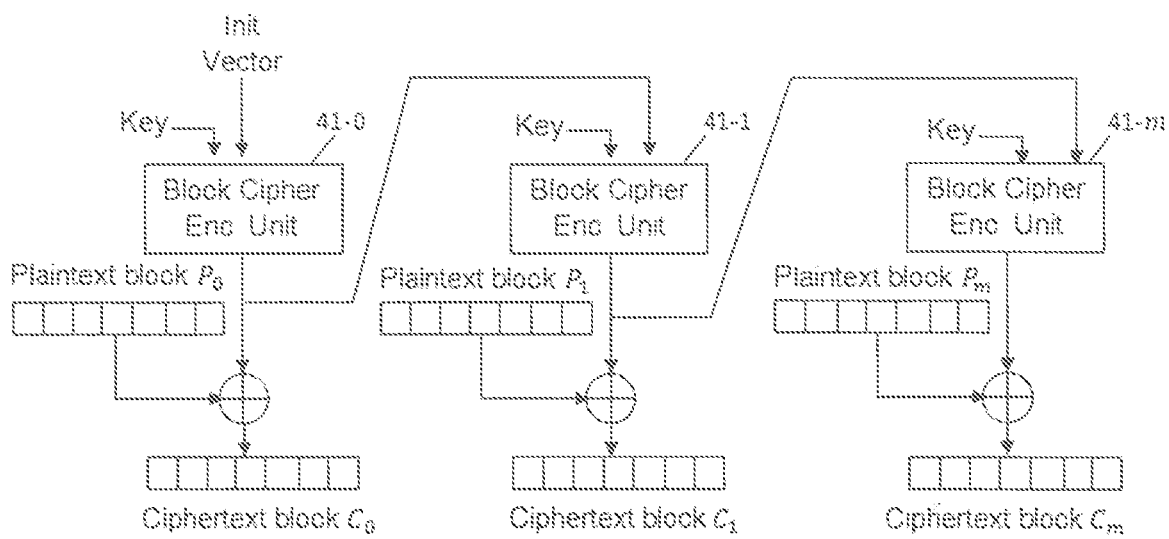
FIG. 4 is a block diagram illustrating the structure of an encryption device implementing the OFB mode of operation of the prior art.
Figure 5:
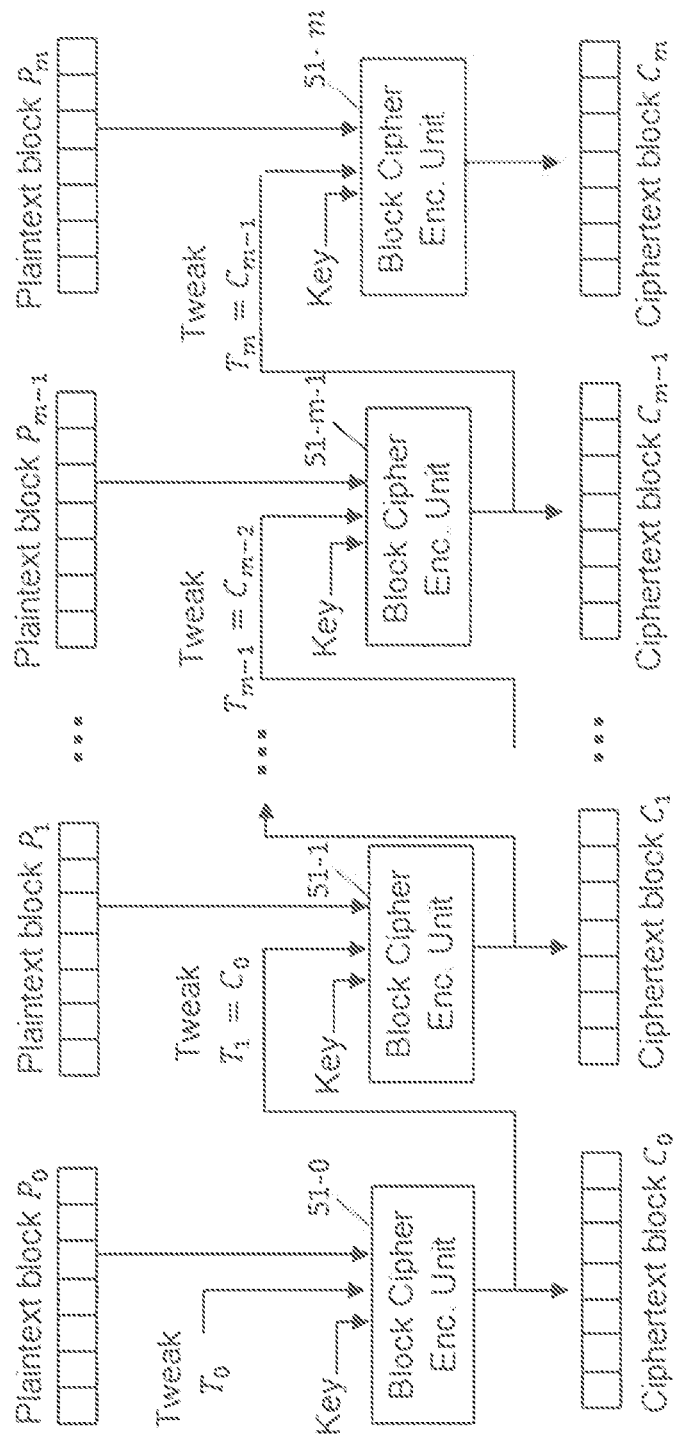
FIG. 5 is a block diagram illustrating the structure of an encryption device implementing the TBC mode of operation of the prior art.
Figure 6:
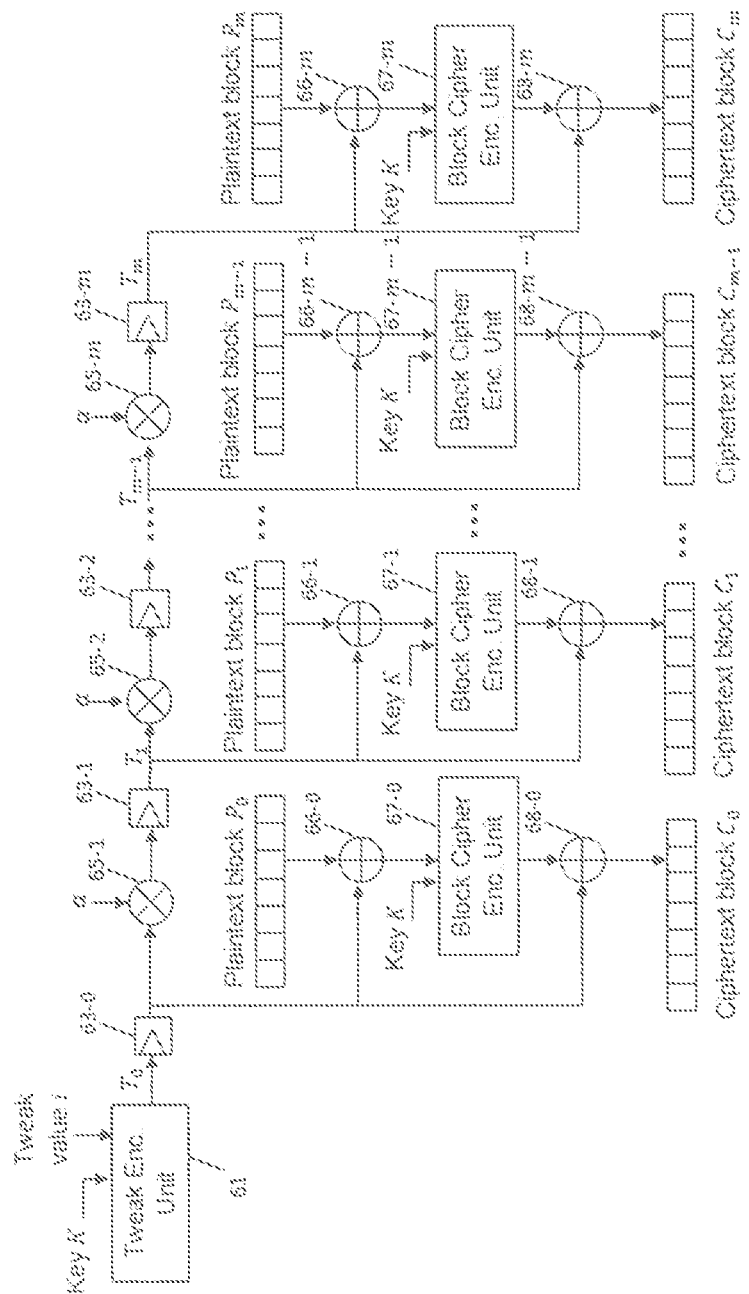
FIG. 6 is a block diagram illustrating the structure of an encryption device implementing the XEX mode of operation of the prior art.
Figure 7:
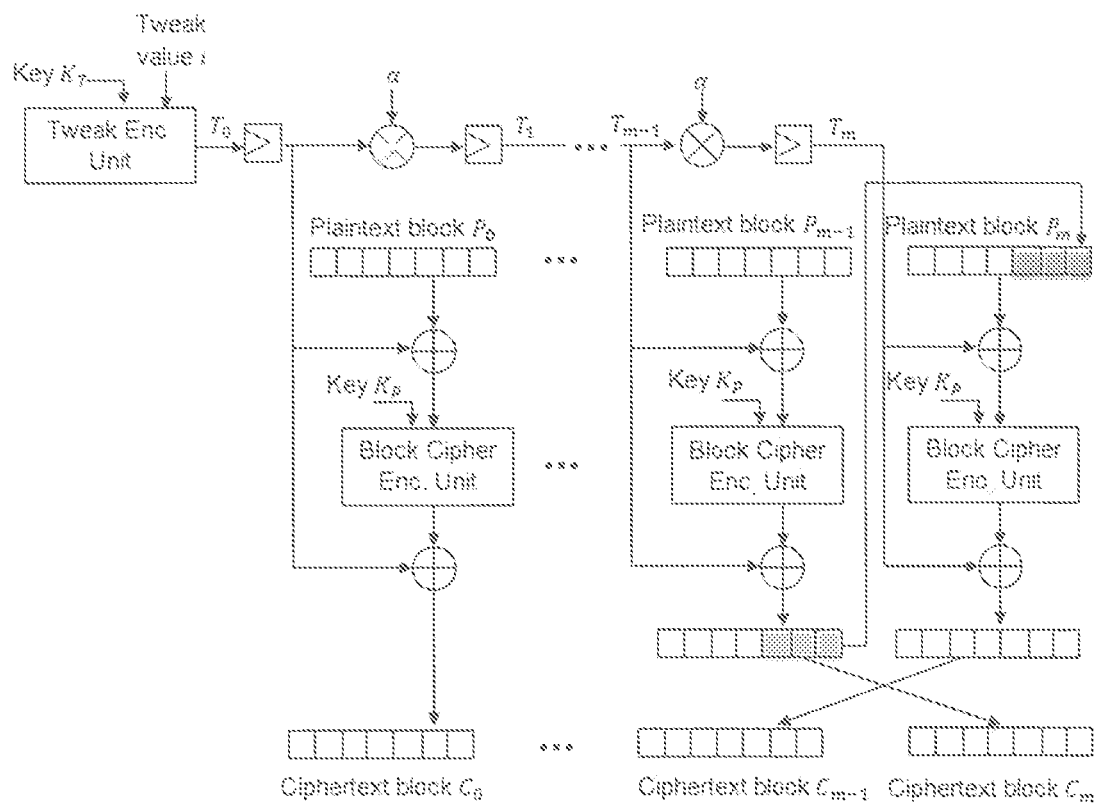
FIG. 7 is a block diagram illustrating the structure of an encryption device implementing the XTS mode of operation of the prior art.

Embodiments of the present disclosure provide devices and methods for secure tweakable block ciphers used for encryption and decryption. The various embodiments of the invention provide low-complexity and secure tweakable modes of operation implemented in block ciphers for encrypting/decrypting data stored in sector-addressable storage media.

Devices and methods according to the embodiments of the disclosure may be implemented to protect and secure data stored in block-oriented storage devices, such as disk drives used in or in combination with several data storage devices applied to various applications.

A disk drive may be any disk capable of holding data/information temporarily or permanently.

The disk drive may be for example a magnetic storage device such as a floppy disk, a hard disk drive, a solid state memory, a magnetic strip, a super disk, a tape cassette, and a zip diskette.

Alternatively, the disk drive may be an optical storage device such as a Blu-Ray™ disc, a CD-ROM disc, a CD-R disc, a CD-RW disc, a DVD-R disc, a DVD+R disc, a DVD-RW disc, and a DVD+RW disc.

The disk drive may be removable (e.g., CDs, USB keys) or embedded in the device (e.g. hard disk drive containing non-removable disk). More generally, the disk drive may be any internal or external storage device that enables data storage and/or data back-up and/or or data transfer.

The disk drive may be implemented in several storage and/or computing devices and/or computing systems such as IoT devices, smartphone, desktop computers, laptops and mobile computers, multimedia storage systems used for example in multimedia servers or the like.

Exemplary applications of disk drives comprise with no limitation audio and video recording (e.g. magnetic and optical recording), computer storage, consumer electronic storage used for example in multimedia applications such as real-time video-on-demand (VoD), interactive VoD, interactive action games, learning on demand, and e-learning.

Data stored in the disk drive may contain text, and/or graphics, and/or audio data, and/or video data, and/or pictures, and/or binary data, or mixed-data containing any combination thereof.

A disk drive is a sector-based storage disk (also referred to as a "sector-based storage device") in which data is stored in a plurality of disk sectors or data units. A disk sector represents the minimum storage unit of the storage disk of a given length such as for example 512 bytes, 2048 bytes, or 4096 bytes. Each sector of the disk is assigned a sector address representing the storage location of the sector within the disk. Each sector is divided into several blocks or data blocks, each block being assigned a block index indicating the position of the block within the sector.

Embodiments of the disclosure provide data encryption/decryption based on the use of block ciphers, and more specifically on the use of tweakable block ciphers. The block ciphers according to the embodiments of the invention take as input the plaintext/ciphertext which is to be encrypted/decrypted, the data encryption/decryption key used to encrypt/decrypt, and a tweak value.

The various embodiments of the disclosure provide secure tweakable block cipher modes of operation for a secure tweakable block cipher encryption device (also referred to as 'a block cipher encryption device') configured to encrypt a data unit plaintext to be stored for example on a disk drive. More specifically, the data unit plaintext corresponds to the data to be stored, after encryption, in a disk sector.

Data encryption using tweakable block ciphers relies on the division of the data unit plaintext into at least one plaintext block, with its size being the same as for the block cipher. In case the data unit can be divided in more than one block, let the last block be lower than or equal to the block-length (in terms of bits) of the block cipher, i.e. the length of the block of data encrypted/decrypted by the block cipher. Tweakable block ciphers also use a tweak value, a tweak encryption key, and a data encryption key.

To facilitate the understanding of some embodiments of the invention, there follows notations and definitions used hereinafter:

$\mathcal{C}$ designates a block cipher used for tweak encryption, plaintext block encryption, and ciphertext decryption;

l designates the block-length of a block cipher $\mathcal{C}$, i.e. the number of bits in a plaintext block/ciphertext block to be encrypted/decrypted using the block cipher $\mathcal{C}$. For example, for the AES block cipher, l=128 bits;

k designates the bit-size of the last plaintext block/ciphertext block, k takes l if the plaintext/ciphertext block is complete or the useful number of bits in the plaintext/ciphertext block otherwise;

$\alpha$ stands for the primitive element of the Galois Field $GF(2^l)$ that corresponds to a polynomial;

$\oplus$ designates the bit-wise exclusive-OR (XOR) operator;

$\otimes$ designates a combinatorial function (e.g. modular multiplication of two polynomials over the binary Galois Field GF(2)). In embodiments in which the block cipher $\mathcal{C}$ is the AES block cipher, modular multiplications of two polynomials are performed over GF(2) modulo $x^{128}+x^7+x^2+x+1$;

(.|.) stands for a concatenation operator which provides, from two or more input scalars or vectors, a list in the form of a vector, the elements of the list being equal to the concatenated inputs;

$P=(P_0|P_1|, \ldots, |P_m)$ designates a data unit plaintext divided into (m+1) plaintext blocks $P_j$ for $j=0, \ldots, m$ such that m is the largest integer such that l×m+k is no more than the bit-size of the data unit plaintext. Accordingly, the first m plaintext blocks $P_j$ for $j=0, \ldots, m-1$ are all exactly l-bits long, and the last plaintext block $P_m$ has a bit-length between 0 and (k−1)-bit long;

j designates a block index assigned to the plaintext block $P_j$ (respectively the ciphertext block $C_j$) and representing the position of the plaintext block $P_j$ (respectively the ciphertext block $C_j$) within the data unit plaintext (respectively the data unit ciphertext). The first plaintext block $P_0$ (respectively the first ciphertext block $P_0$) is assigned the block index $j=0$;

i refers to a tweak value assigned to the data unit plaintext P and the data unit ciphertext C. The tweak value may be any non-negative integer value indicating/representing the sector position/address assigned to the sector/data unit containing the data unit plaintext and the data unit ciphertext;

Key $K_T$ refers to a first encryption key (also referred to as a 'tweak encryption key') used for the tweak value encryption;

Key $K_P$ refers to a second encryption key (also referred to as a 'plaintext encryption key' or 'ciphertext decryption key') used for plaintext data encryption and ciphertext data decryption;

$E\mathcal{C}_{,K_T}(i)$ refers to an encrypted tweak value obtained by encrypting the tweak value i using the block cipher $\mathcal{C}$ and the tweak encryption key $K_T$;

$T_j$ for $j=0, \ldots, m$ refers to a tweak block generated from a combinatorial function applied to a value derived from the tweak value (e.g. the encrypted tweak value $E\mathcal{C}_{,K_T}(i)$) and a function $f(j)$ of the block index assigned to the $j^{th}$ plaintext block P;

$IP_j$ refers to an intermediate plaintext block determined from the processing/in association of/with the $j^{th}$ plaintext block $P_j$;

$IC_j$ refers to an intermediate ciphertext block determined from the processing/in association of/with the $j^{th}$ ciphertext block $C_j$;

$C_j$ for $j=0, \ldots, m$ refers to the $j^{th}$ ciphertext block determined in association with the $j^{th}$ plaintext block P;

$C=(C_0|C_1|, \ldots, |C_m)$ designates a data unit ciphertext obtained by the concatenation of the ciphertext blocks $C_j$ for $j=0, \ldots, m$.

The various embodiments of the disclosure provide security mechanisms implemented in tweakable block cipher encryption and decryption devices for securing the used modes of operations.

Figure 8:
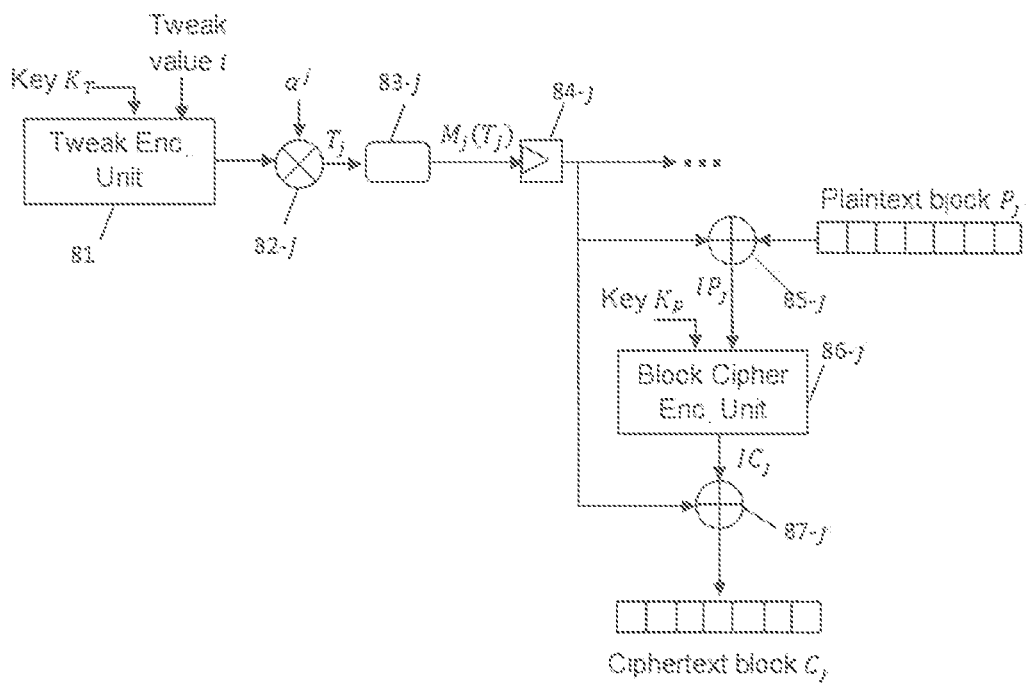
FIG. 8 is a block diagram illustrating the structure of a single cipher's plaintext block encryption unit according to some embodiments of the invention.

FIG. 8 is a block diagram illustrating the structure of a block cipher encryption device for encrypting a data unit plaintext $P=(P_0|P_1|, \ldots, |P_m)$ according to a secure tweakable block cipher operation mode according to the disclosed solution. The data unit plaintext is assigned a tweak value i and is divided into one or more $(m+1; m+1 \geq 1)$ plaintext blocks $P_j$ for $j=0, \ldots, m$. FIG. 8 illustrates the processing of a single plaintext block, the $j^{th}$ plaintext block of block index j, for determining the $j^{th}$ ciphertext block associated with the $j^{th}$ plaintext block. The repetition of the single block processing to cover all the plaintext blocks is defined by the mode of operation of the block cipher encryption device. As depicted in FIG. 8, the block cipher encryption device may comprise:

a tweak encryption unit 81 configured to determine an encrypted tweak value $E\mathcal{C}_{,K_T}(i)$ by encrypting the tweak value i using a block cipher $\mathcal{C}$ and a tweak encryption key $K_T$, and a combinatorial function unit 82-$j$ associated with each plaintext block P for $j=0, \ldots, m$, the $j^{th}$ combinatorial function unit 82-$j$ being configured to determine a tweak block value $T_j$ by applying a combinatorial function between a value derived from the tweak value i, for instance the encrypted tweak value $E\mathcal{C}_{,K_T}(i)$, and a function $f(j)$ of the block index j assigned to the plaintext block $P_j$ according to:

$$T_j = E\mathcal{C}_{,K_T}(i) \otimes f(j) \quad (1)$$

According to some embodiments, the function $f(j)$ may be an exponentiation function represented by a base value and an exponent value, the base value being a primitive element $\alpha$ over a given finite field and the exponent value being equal to the block index j according to:

$$f(j) = \alpha^j \quad (2)$$

For the first plaintext block $P_0$, the combinatorial function unit 82-0 is configured to determine the tweak block $T_0 = E\mathcal{C}_{,K_T}(i) \otimes f(0) = E\mathcal{C}_{,K_T}(i)$ given that $f(0) = \alpha^0 = 1$ for any non-zero primitive element $\alpha \neq 0$.

In some embodiments, the combinatorial function may be a modular multiplication.

The security mechanisms according to the embodiments of the invention are based on the use of masking algorithms to protect the tweak value and the tweak blocks T obtained from the encrypted tweak value $E\mathcal{C}_{,K_T}(i)$ through combinatorial functions (e.g. modular multiplications). Accordingly, the block cipher encryption device comprises, in association with each plaintext block $P_j$ for $j=0, \ldots, m$, a first masking unit 83-$j$ configured to determine a masked value $M_j(T_j)$ by applying a data masking algorithm to the tweak block value $T_j$ determined by the combinatorial function unit 82-$j$ associated with the $j^{th}$ plaintext block $P_j$.

The application of the masking countermeasures advantageously enables protecting the tweak blocks such that the masked value $M_j(T_j)$ is stored in a storage unit (e.g. a register) 84-$j$ rather than storing the tweak block itself. Such protection provides security against attacks that target recovering the tweak blocks usually stored in the registers 84-$j$ for $j=0, \ldots, m$.

The block cipher encryption device may be configured to determine the $j^{th}$ ciphertext block associated with the $j^{th}$ plaintext block by applying a first XOR operation, a data encryption, and a second XOR operation. With reference to FIG. 8, the block cipher encryption device may further comprise, in association with each plaintext block $P_j$ for $j=0, \ldots, m$:

a first XOR unit 85-$j$ configured to determine an intermediate plaintext block IP by applying the XOR operation between the masked value $M_j(T_j)$ and the plaintext block P according to:

$$IP_j = M_j(T_j) \oplus P_j \quad (3)$$

a block cipher encryption unit 86-$j$ configured to determine an intermediate ciphertext block $IC_j$ by encrypting the intermediate plaintext block $IP_j$ using a block cipher $\mathcal{C}$ and a data encryption key $K_P$ such that:

$$IC_j = E\mathcal{C}_{,KP}(IP_j) \quad (4)$$

a second XOR unit 87-$j$ configured to determine a ciphertext block $C_j$ by applying the XOR operation between the masked value $M_j(T_j)$ and the intermediate ciphertext block $IC_j$ according to:

$$C_j = M_j(T_j) \oplus IC_j \quad (5)$$

The block cipher encryption device may be configured to determine a data unit ciphertext by performing a concatenation of the m+1 ciphertext blocks $C_j$ such that $C=(C_0|C_1|, \ldots, |C_m)$.

According to some embodiments, the data masking algorithm may be an additive masking algorithm.

In some other embodiments, the data masking algorithm may be a multiplicative masking algorithm based on an invertible mask value.

The tweak encryption key $K_T$ and the data encryption key $K_P$ may be derived from an initial key $K\mathcal{C}$ such that the initial key is a concatenation of the tweak encryption key and the data encryption key $K\mathcal{C} =(K_T K_P)$.

According to some embodiments, for example based on the XEX mode of operation, the tweak encryption key $K_T$ and the data encryption key $K_P$ may be similar.

In other embodiments, for example based on the XTS mode of operation, the tweak encryption key $K_T$ and the data encryption key $K_P$ may be different.

In one embodiment, the block cipher $\mathcal{C}$ may implement masking countermeasures using a block cipher masking algorithm, the block cipher masking algorithm being an additive masking algorithm or a multiplicative masking algorithm using invertible mask values. Exemplary block cipher masking algorithms comprise the RSM masking used in the AES block cipher.

In addition to the data masking algorithm applied by the first masking unit 83-$j$ for j=0, . . . , m and/or to the block cipher masking algorithm applied in the block cipher $\mathcal{C}$ implemented within the block cipher encryption units 86-$j$ for j=0, . . . , m, the block cipher encryption device may implement additional masking countermeasures involving additional masking units with the purpose of securing the tweak block-dependent values in the different paths in the chain. FIGS. 9 to 13 depict five variants of exemplary masking countermeasures implementations.

Figure 9:
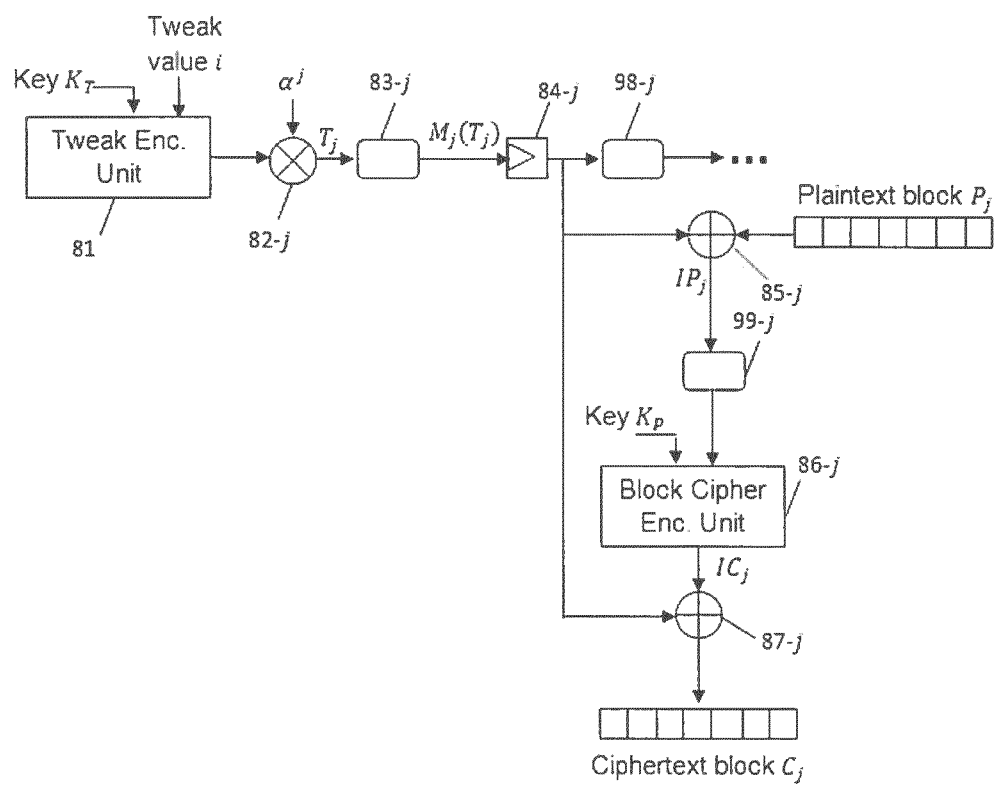
FIG. 9 is a block diagram illustrating the structure of a single cipher's plaintext block encryption unit according to some embodiments of the invention in which additive masking is applied.

FIG. 9 is a block diagram illustrating the structure of a single block processing unit according to a first variant in which the block cipher $\mathcal{C}$ applied by the block cipher encryption units 86-$j$, for j=0, . . . , m, implements a block cipher masking algorithm, the data being unmasked before combinatorial function and before data encryption by the block cipher encryption unit 86-$j$. The block cipher masking algorithm applied by each block cipher encryption unit 86-$j$ may be an iterated additive masking algorithm that performs several masking iterations, a mask value being used at each masking iteration. Each first masking unit 83-$j$ for j=0, . . . , m may be configured to apply an additive data masking algorithm that uses as mask value the mask value implemented by the block cipher encryption unit 86-$j$ at the last masking iteration. The block cipher encryption device may further comprise, in association with each plaintext block $P_j$ for j=0, . . . , m:
- a second masking unit 98-$j$ configured to apply a data masking algorithm to the masked value determined by the first masking unit 83-$j$, and
- a third masking unit 99-$j$ configured to apply a data masking algorithm to the intermediate plaintext block $IP_j$ before being encrypted by the block cipher encryption unit 86-$j$, the data masking algorithm applied by the second masking unit 98-$j$ and the third masking unit 99-$j$ being an additive masking algorithm using as a mask value the mask value implemented by the block cipher encryption unit 86-$j$ at the last masking iteration of the iterated additive masking algorithm.

According to the first variant depicted in FIG. 9, the masked tweak blocks $M_j(T_j)$ stored in each storage unit 84-$j$, for j=0, . . . , m, are unmasked by the second masking units 98-$j$ in such a way that data in the combinatorial function units 82-$j$ are unmasked. Data in the combinatorial function units 82-$j$ are unmasked, but since the combinatorial function performed by the combinatorial function units 82-$j$ are fully combinatorial, attacks targeted on the combinatorial part are made more difficult. The inputs of the block cipher encryption units 86-$j$ for j=0, . . . , m are unmasked (by the application of the third masking units 99-$j$ for j=0, . . . , m) before being processed by the block cipher encryption units 86-$j$ such that encryption is executed on the plaintext data without propagating a parasitical mask in addition to the block cipher masking implemented inside the block cipher encryption units 86-$j$. Given the implementation of block cipher masking, the outputs of the block cipher encryption units 86-$j$ are still masked and are then unmasked during the final XOR operation performed by the second XOR units 87-$j$, for j=0, . . . , m.

Figure 10:
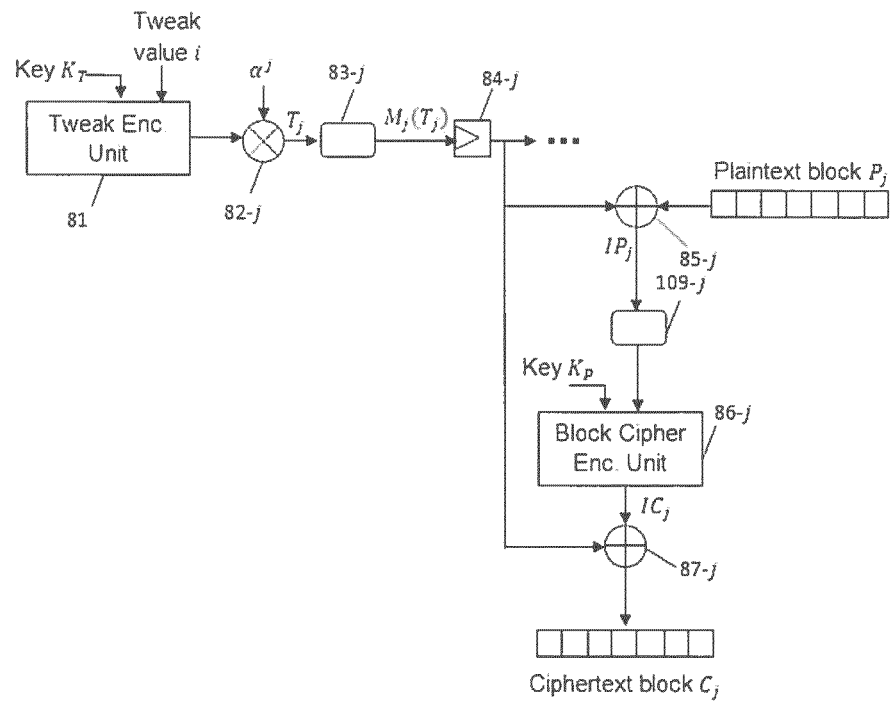
FIG. 10 is a block diagram illustrating the structure of a single cipher's plaintext block encryption unit according to embodiments of the invention in which additive masking is applied.

FIG. 10 is a block diagram illustrating the structure of a single block processing unit according to a second variant in which the block cipher $\mathcal{C}$ applied by the block cipher encryption units 86-$j$, for j=0, . . . , m, implements a block cipher masking algorithm, the data being unmasked only before data encryption by the block cipher encryption unit 86-$j$ and the masked tweak blocks $M_j(T_j)$ are stored in each storage unit 84-$j$, for j=0, . . . , m. In the second variant depicted in FIG. 10, the block cipher masking algorithm applied by each block cipher encryption unit 86-$j$ may be an iterated additive masking algorithm that performs several masking iterations, a mask value being used at each masking iteration. In such embodiment, each first masking unit 83-$j$ for j=0, . . . , m may be configured to apply an additive data masking algorithm that uses as a mask value an affine function of the mask value implemented by the block cipher encryption unit 86-$j$ at the last masking iteration of the iterated additive block cipher masking algorithm. The block cipher encryption device may comprise, in association with each plaintext block $P_j$ for j=0, . . . , m, a second masking unit 109-$j$ configured to apply the data masking algorithm to the intermediate plaintext block $IP_j$ before being encrypted by the block cipher encryption unit 86-$j$, the data masking algorithm using as a mask value the affine function of the mask value implemented by the block cipher encryption unit 86-$j$ at the last masking iteration of the iterated additive block cipher masking algorithm.

The affine function may be represented by a slope coefficient and a constant value, the slope coefficient being a predefined primitive element a over a given finite field $GF(2^l)$, the constant value corresponding to the mask value implemented by the block cipher encryption unit 86-($j$+1) at the last masking iteration of the iterated additive block cipher masking algorithm.

According to the second variant, the data after the combinatorial function are never unmasked, so that data processed at the combinatorial function units is masked. The inputs of the block cipher encryption units 86-$j$ for j=0, . . . , m are unmasked (by the application of the second masking units 109-$j$ for j=0, . . . , m) before being processed by the block cipher encryption units 86-$j$ such that encryption is executed on the plaintext data without propagating a parasitical mask in addition to the block cipher masking implemented inside the block cipher encryption units 86-$j$. The block cipher masking implemented inside the block cipher encryption units 86-$j$ enables an end-to-end masking of data and is different from the data masking implemented in the first masking units 83-$j$. Given the implementation of block cipher masking, the outputs of the block cipher encryption units 86-$j$ are still masked and are then unmasked during the final XOR operation performed by the second XOR units 87-$j$, for j=0, . . . , m such that the ciphertext blocks are unmasked at the end of the encryption process.

Figure 11:
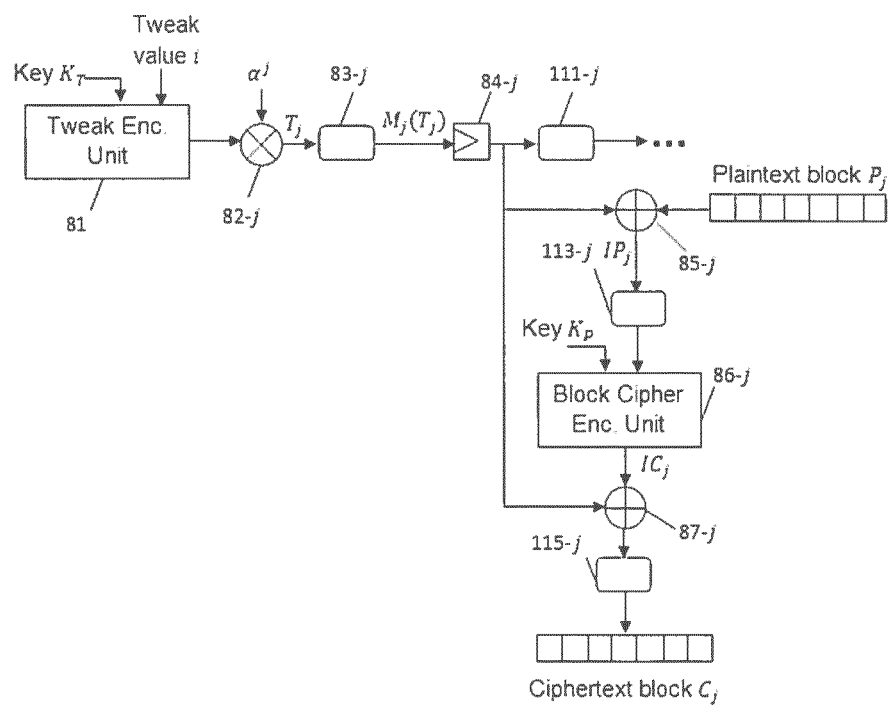
FIG. 11 is a block diagram of a single cipher's plaintext block encryption unit according to embodiments of the invention in which predefined mask values are used.

FIG. 11 is a block diagram illustrating the structure of a single block processing unit according to a third variant in which data is unmasked before the combinatorial function, before data encryption by the block cipher encryption units 86-$j$, and after the application of the XOR operation by the second XOR units 87-$j$ for j=0, . . . , m, and the masked tweak blocks $M_j(T_j)$ are stored in each storage unit 84-$j$, for j=0, ..., m. Accordingly, the block cipher encryption device may comprise, in association with each plaintext block $P_j$ for j=0, ..., m:

- a second masking unit 111-j configured to apply a data masking algorithm to the masked value determined by the first masking unit 83-j, and
- a third masking unit 113-j configured to apply a data masking algorithm to the intermediate plaintext block $IP_j$ before being encrypted by the block cipher encryption unit 86-j, and
- a fourth masking unit 115-j configured to apply the data masking algorithm to the ciphertext block determined by the second XOR unit 87-j, thereby providing the final ciphertext block $C_j$;

According to some embodiments, the data masking algorithm used in the third variant may be an additive masking algorithm using a predefined mask value $m_j$ in association with each plaintext block $P_j$ for j=0, ..., m, each predefined mask value $m_j$ being selected from a set of predefined mask values.

According to some embodiments, the block cipher $C$ may implement a block cipher masking or unmasking algorithm, the block cipher encryption units 86-j being configured to perform masking and encryption or only encryption of input data. In such embodiments, the inputs of the block cipher encryption units 86-j for j=0, ..., m are unmasked (by the application of the third masking units 113-j for j=0, ..., m) before being processed by the block cipher encryption units 86-j such that encryption is executed on the plaintext data without propagating a parasitical mask in addition to the block cipher masking implemented inside the block cipher encryption units 86-j. Given the implementation of block cipher masking, the outputs of the block cipher encryption units 86-j are still masked and are then unmasked using the fourth masking units 115-j, for j=0, ..., m such that the ciphertext blocks are unmasked at the end of the encryption process.

In other embodiments, the block cipher $C$ may not implement masking countermeasures.

Advantageously, the use of predefined mask values instead of the last masking iteration mask values of the block cipher $C$ applied by the block cipher encryption units 86-j brings more entropy and is easy to adapt over any block cipher.

Figure 12:
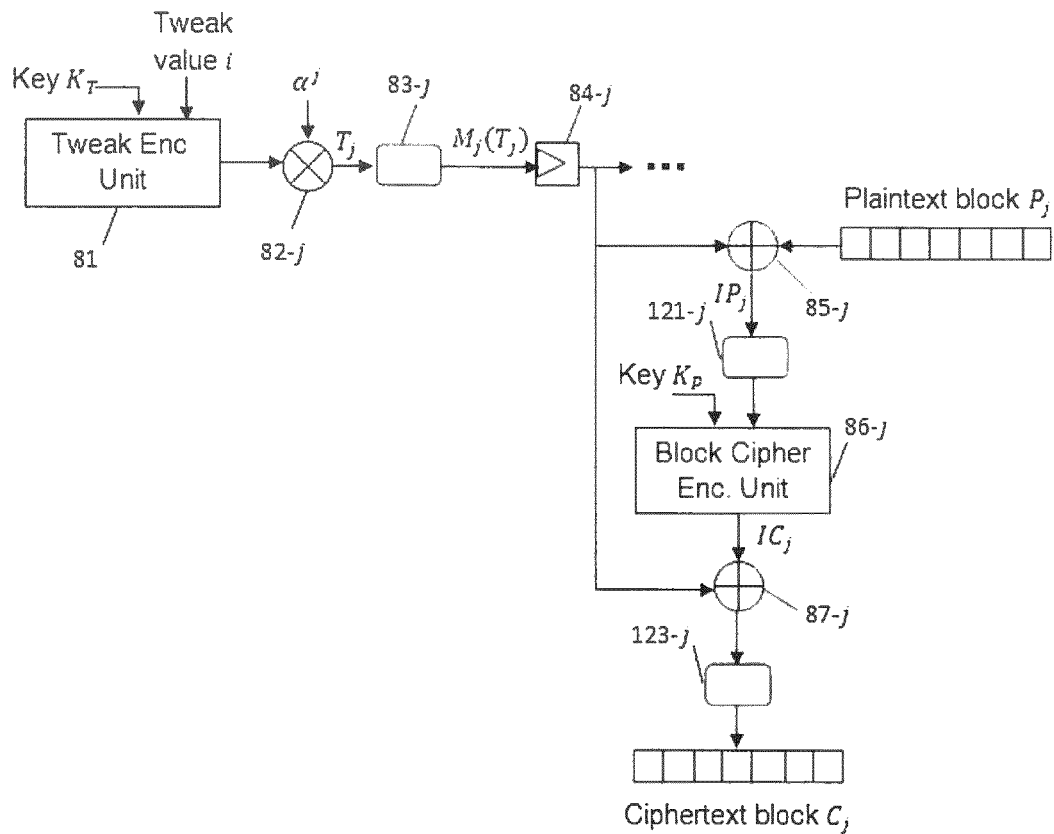
FIG. 12 is a block diagram of a single cipher's plaintext block encryption unit according to embodiments of the invention.

FIG. 12 is a block diagram illustrating the structure of a single block processing unit according to a fourth variant in which data is unmasked before data encryption by the block cipher encryption units 86-j and after the application of the XOR operation by the second XOR units 87-j for j=0, ..., m. Accordingly, the block cipher encryption device may comprise, in association with each plaintext block P for j=0, ..., m:

- a second masking unit 121-j configured to apply a data masking algorithm to the intermediate plaintext block $IP_j$ before being encrypted by the block cipher encryption unit 86-j to the masked value determined by the first masking unit 83-j, the application of the data masking algorithm enabling unmasking data previously determined by the first masking unit 83-j, and
- a third masking unit 123-j configured to apply a data masking algorithm to the ciphertext block determined by the second XOR unit 87-j, thereby providing the final ciphertext block $C_j$.

According to the fourth variant, the masked tweak blocks $M_j(T_j)$ are stored in storage units 84-j, for j=0, ..., m. data before the combinatorial function is never unmasked, the data processed at the combinatorial function units being thus masked, which prevent any adversaries from attacking the combinatorial function units.

The data masking algorithm used in the fourth variant may be an additive masking algorithm using an affine function of a predefined mask value selected from a set of predefined mask values, the affine function being represented by a slope coefficient and a constant value, the slope coefficient being a predefined primitive element α over a given finite field (e.g. $GF(2^l)$), the constant value being a predefined mask value selected from a predefined set of mask values.

In some embodiments, the block cipher $C$ may implement a block cipher masking algorithm, the block cipher encryption units 86-j being configured to perform masking and encryption of input data. In such embodiments, the inputs of the block cipher encryption units 86-j for j=0, ..., m are unmasked (by the application of the second masking units 121-j for j=0, ..., m) before being processed by the block cipher encryption units 86-j such that encryption is executed on the plaintext data without propagating a parasitical mask in addition to the block cipher masking implemented inside the block cipher encryption units 86-j. Given the implementation of block cipher masking, the outputs of the block cipher encryption units 86-j are still masked and are then unmasked using the third masking units 123-j, for j=0, ..., m such that the ciphertext blocks are unmasked at the end of the encryption process.

In other embodiments, the block cipher $C$ may not implement masking countermeasures.

Figure 13:
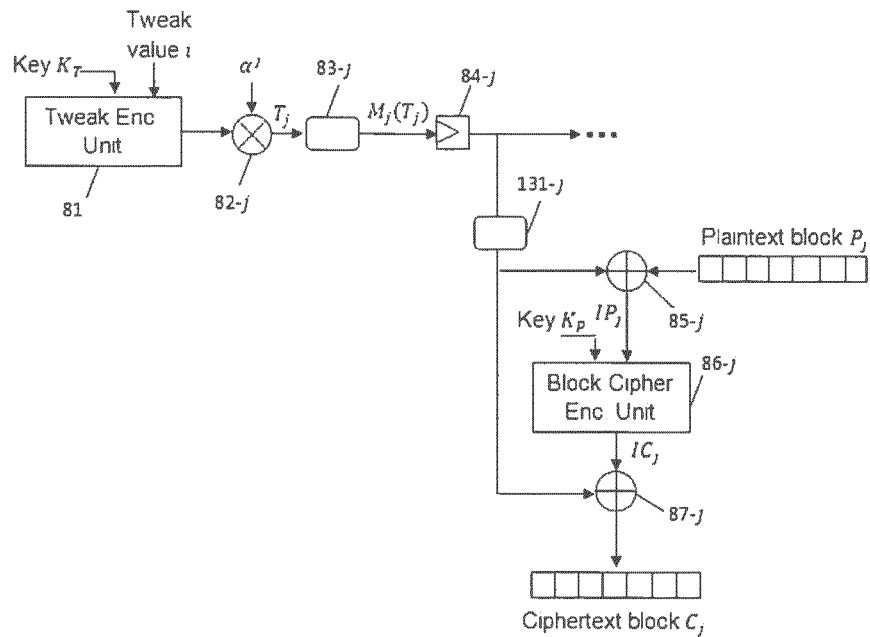
FIG. 13 is a block diagram of a single cipher's plaintext block encryption unit according to embodiments of the invention in which multiplicative masking is used.

FIG. 13 is a block diagram illustrating the structure of a single block processing unit according to a fifth variant in which masked values $M_j$ are unmasked after being stored in the storage units 84-j and before being XORed with the plaintext blocks. In such embodiments, the block cipher encryption device may comprise, in association with each plaintext block $P_j$ for j=0, ..., m, a second masking unit 131-j configured to apply a data masking algorithm to the masked value $M_j(T_j)$ determined by the first masking unit 83-j and stored in the storage unit 84-j.

According to some embodiments using the fifth variant, the data masking algorithm may be a multiplicative masking using predefined invertible mask values, a predefined invertible mask value being associated with each plaintext block.

In some embodiments using the fifth variant, the block cipher $C$ may implement a block cipher masking algorithm.

Alternatively, the block cipher $C$ may not implement masking countermeasures.

The block cipher $C$ may be chosen in a group comprising the AES block cipher, the DES block cipher, the TDEA block cipher, the SEED block cipher, the SM4 block cipher, Camellia block cipher, the Blowfish block cipher, the Simon block cipher, the IDEA block cipher, and the RC5.

In one embodiment, the block cipher encryption device may be configured to encrypt the data unit plaintext according to a tweakable mode of operation chosen in a group comprising the XEX mode of operation and the XTS mode of operation.

The XTS mode of operation differs from the XEX mode in two aspects. Firstly, the XEX mode uses a same encryption key for tweak encryption and plaintext block encryption while the XTS mode uses two different keys, a tweak encryption key for tweak encryption and a data encryption key for plaintext block encryption. Secondly, they differ in the processing of data unit plaintexts of bit-lengths which are not divisible by the block-length l of the used block cipher $C$. The encryption of such data unit plaintexts is not supported by the XEX mode, while the XTS mode enables encryption of such data unit plaintexts by implementing ciphertext stealing.

The following description of the device and method for encrypting a data unit plaintext by a repetition of the single block encryption according to some embodiments will be based on the use of the XTS mode of operation for illustration purposes only. However, the skilled person will readily understand that the encryption also applies to block ciphers that use other tweakable modes of operation such that the XEX mode.

Figure 14:
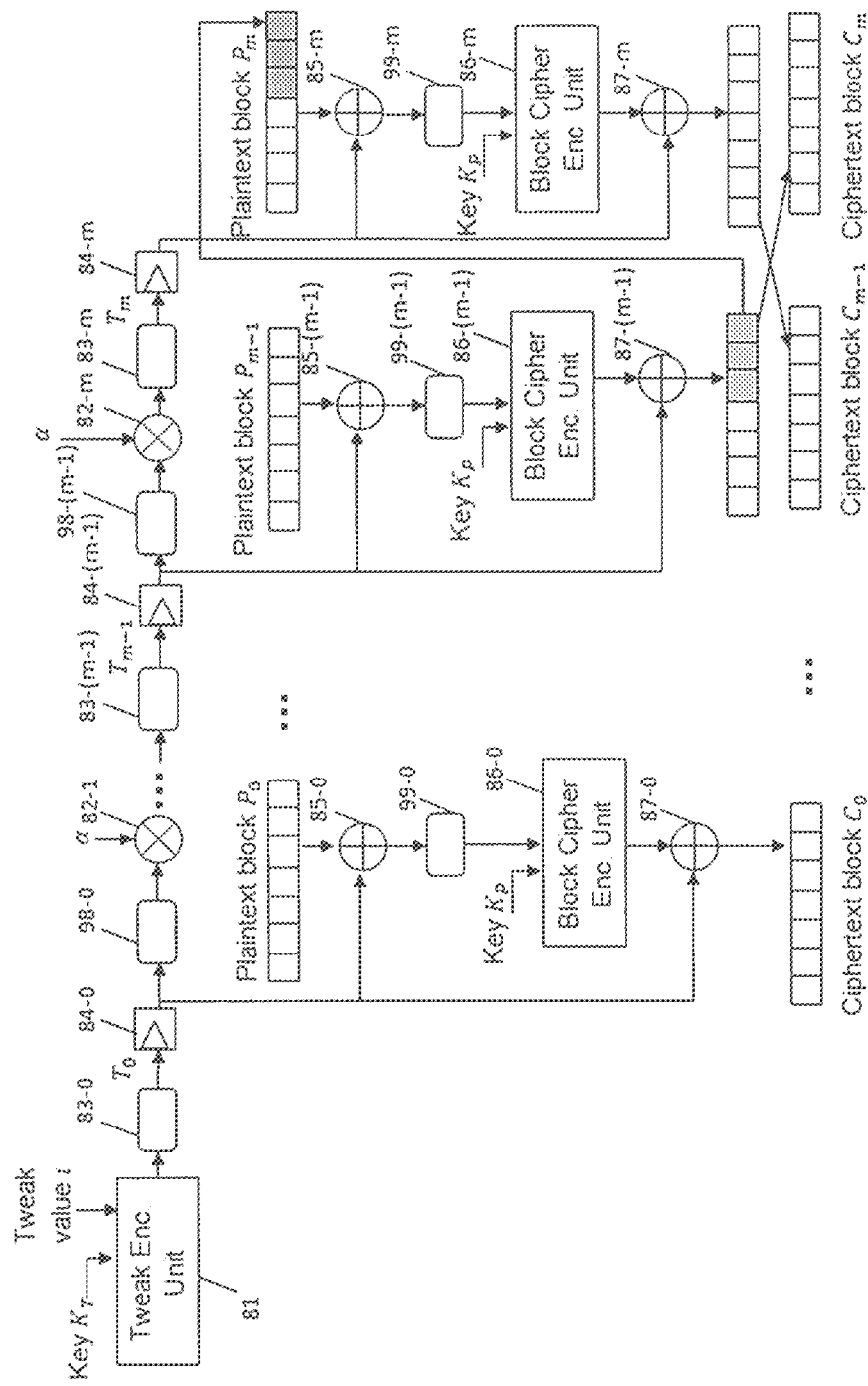
FIG. 14 is a block diagram of an encryption device implementing the XTS mode of operation according to embodiments of the invention in which an additive masking algorithm is considered.

FIG. 14 is a block diagram illustrating a block cipher encryption device configured to encrypt a data unit plaintext $P=(P_0, \ldots, P_m)$ comprising m+1 plaintext blocks according to some embodiments which use the first variant of single block encryption to encrypt each of the m+1 plaintext blocks according to the XTS mode of operation.

In such embodiments, the block cipher encryption device comprises:
- a tweak encryption unit 81 configured to determine an encrypted tweak value $E\mathcal{C}_{K_T}(i)$ by encrypting the tweak value i using a block cipher $\mathcal{C}$ and a tweak encryption key $K_T$;
- m+1 combinatorial function units 82-j for j=0, ..., m, the $j^{th}$ combinatorial function unit 82-j being configured to determine a tweak block value $T_j$ by applying a combinatorial function between a value derived from the tweak value (e.g. the encrypted tweak block $E\mathcal{C}_{K_T}(i)$) and the primitive element a. The first combinatorial function unit 82-0 is not illustrated on FIG. 14 for simplification reasons, as for the first plaintext block, the block index j=0, thus $T_0=E\mathcal{C}_{K_T}(i)$;
- m+1 first masking units 83-j for j=0, ..., m, the $j^{th}$ first masking unit 83-j being configured to determine a masked value $M_j(T_j)$ by applying a data masking algorithm to the tweak block value $T_j$;
- m+1 storage units 84-j, for j=0, ..., m, the $j^{th}$ storage unit 84-j being configured to store the masked value $M_j(T_j)$;
- m+1 first XOR units 85-j for j=0, ..., m, the $j^{th}$ first XOR unit 85-j being configured to determine an intermediate plaintext block $IP_j$ according to equation (3);
- m+1 block cipher encryption units 86-j for j=0, ..., m, the $j^{th}$ configured to determine an intermediate ciphertext block $IC_j$ by encrypting the intermediate plaintext block $IP_j$ using a block cipher $\mathcal{C}$ according to equation (4), the block cipher implementing an additive iterated block cipher masking algorithm that performs several masking iterations, a mask value being used at each masking iteration;
- m+1 second XOR units 87-j for j=0, ..., m, the $j^{th}$ second XOR unit 87-j being configured to determine a ciphertext block $C_j$ according to equation (5);
- m+1 second masking units 98-j for j=0, ..., m, the $j^{th}$ second masking unit 98-m being configured to apply a masking algorithm to the masked value $M_j(T_j)$ determined by the first masking unit 83-j, and
- m+1 third masking units 99-j for j=0, ..., m, the $j^{th}$ third masking unit 99-j being configured to apply a masking algorithm to the intermediate plaintext block IP before being encrypted by the block cipher encryption unit 86-j.

The data masking algorithm applied by the first masking unit 83-j, the second masking unit 98-j, and the third masking units 99-j, for j=0, ..., m, may be an additive masking algorithm that uses as a mask value the mask value implemented in the additive iterated block cipher masking algorithm of the block cipher $\mathcal{C}$ applied at the block cipher encryption unit 83-j at the last masking iteration.

Figure 15:
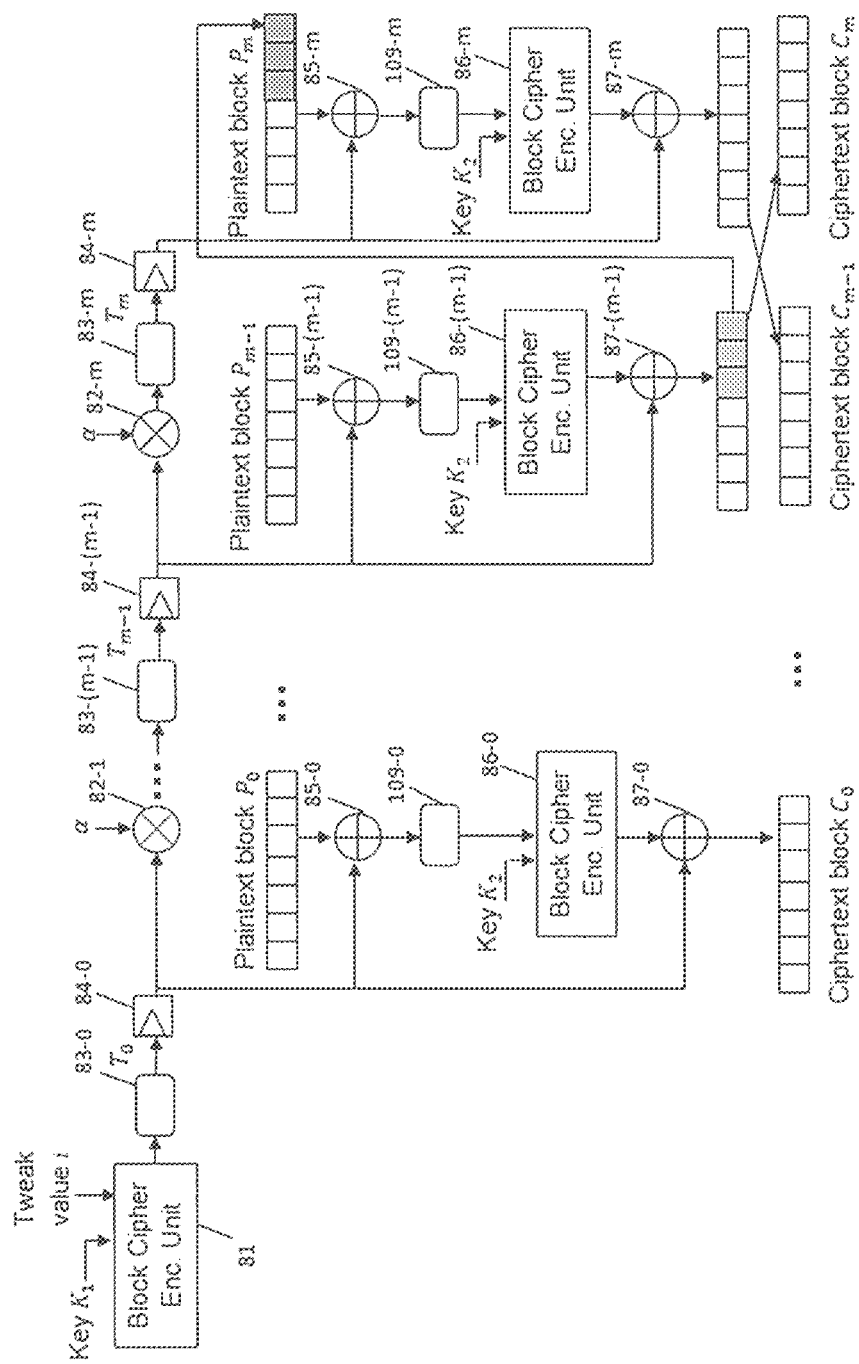
FIG. 15 is a block diagram of an encryption device implementing the XTS mode of operation according to embodiments of the invention in which an additive masking algorithm is considered.

FIG. 15 is a block diagram illustrating a block cipher encryption device configured to encrypt a data unit plaintext $P=(P_0, \ldots, P_m)$ comprising m+1 plaintext blocks according to some embodiments which use the second variant of single block encryption to encrypt each of the m+1 plaintext blocks according to the XTS mode of operation.

In such embodiments, the block cipher encryption device comprises:
- a tweak encryption unit 81 configured to determine an encrypted tweak value $E\mathcal{C}_{K_T}(i)$ by encrypting the tweak value i using a block cipher $\mathcal{C}$ and a tweak encryption key $K_T$;
- m+1 combinatorial function units 82-j for j=0, ..., m, the $j^{th}$ combinatorial function unit 82-j being configured to determine a tweak block value $T_j$ by applying a combinatorial function to a value derived from the tweak value (e.g. the encrypted tweak block $E\mathcal{C}_{K_T}(i)$) and the primitive element α. The first combinatorial function unit 82-0 is not illustrated for simplification reasons, as for the first plaintext block, the block index j=0, thus $T_0=E\mathcal{C}_{K_T}(i)$;
- m+1 first masking units 83-j for j=0, ..., m, the $j^{th}$ first masking unit 83-j being configured to determine a masked value $M_j(T_j)$ by applying a data masking algorithm to the tweak block value $T_j$;
- m+1 storage units 84-j, for j=0, ..., m, the $j^{th}$ storage unit 84-j being configured to store the masked value $M_j(T_j)$;
- m+1 first XOR units 85-j for j=0, ..., m, the $j^{th}$ first XOR unit 85-j being configured to determine an intermediate plaintext block $IP_j$ according to equation (3);
- m+1 block cipher encryption units 86-j for j=0, ..., m, the $j^{th}$ configured to determine an intermediate ciphertext block $IC_j$ by encrypting the intermediate plaintext block $IP_j$ using a block cipher $\mathcal{C}$ according to equation (4), the block cipher implementing an additive iterated block cipher masking algorithm that performs several masking iterations, a mask value being used at each masking iteration;
- m+1 second XOR units 87-j for j=0, ..., m, the $j^{th}$ second XOR unit 87-j being configured to determine a ciphertext block $C_j$ according to equation (5);
- m+1 second masking units 109-j for j=0, ..., m, the $j^{th}$ second masking unit 109-j being configured to apply a masking algorithm to the intermediate plaintext block $IP_j$ before being encrypted by the block cipher encryption unit 86-j.

In some embodiments, the data masking algorithm applied by the first masking unit 83-j and the second masking unit 109-j, for j=0, ..., m, may be an additive masking algorithm that uses as a mask value the affine function of the mask value implemented by the block cipher encryption unit 86-j at the last masking iteration of the iterated additive block cipher masking algorithm. The affine function may be represented by a slope coefficient and a constant value, the slope coefficient being a predefined primitive element α over a given finite field $GF(2^l)$, the constant value corresponding to the mask value implemented by the block cipher encryption unit 86-j at the last masking iteration of the iterated additive block cipher masking algorithm.

Figure 16:
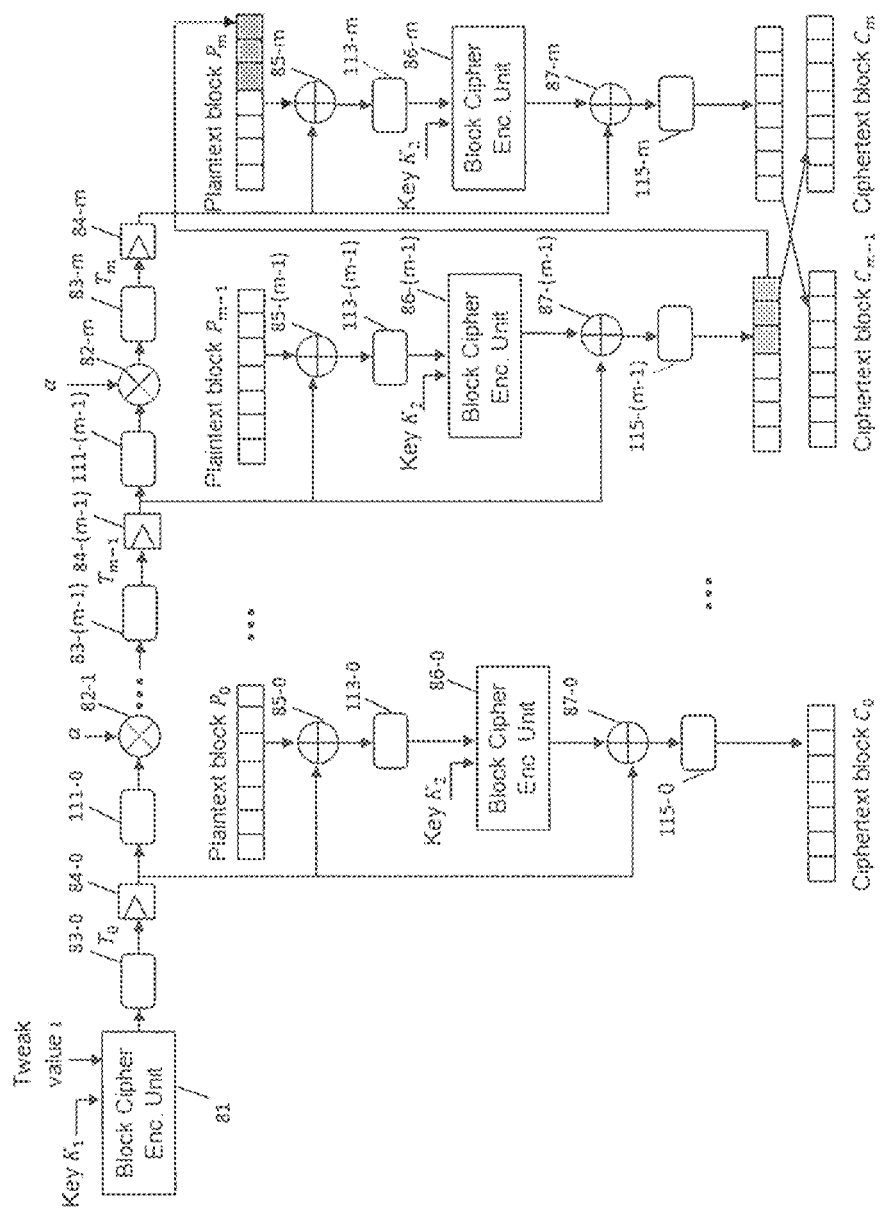
FIG. 16 is a block diagram of an encryption device implementing the XTS mode of operation according to other embodiments of the invention.

FIG. 16 is a block diagram illustrating a block cipher encryption device configured to encrypt a data unit plaintext $P=(P_0, \ldots, P_m)$ comprising m+1 plaintext blocks according to some embodiments which use the third variant of single block encryption to encrypt each of the m+1 plaintext blocks according to the XTS mode of operation.

In such embodiments, the block cipher encryption device comprises:
- a tweak encryption unit 81 configured to determine an encrypted tweak value $E\mathcal{C}_{K_T}(i)$ by encrypting the tweak value i using a block cipher $\mathcal{C}$ and a tweak encryption key $K_T$;
- m+1 combinatorial function units 82-$j$ for j=0, . . . , m, the $j^{th}$ combinatorial function unit 82-$j$ being configured to determine a tweak block value $T_j$ by applying a combinatorial function to a value derived from the tweak value (e.g. the encrypted tweak block $E\mathcal{C}_{K_T}(i)$) and the primitive element a. It should be noted that the first combinatorial function unit 82-0 is not illustrated for simplification reasons, as for the first plaintext block, the block index j=0, and thus $T_0 = E\mathcal{C}_{K_T}(i)$;
- m+1 first masking units 83-$j$ for j=0, . . . , m, the $j^{th}$ first masking unit 83-$j$ being configured to determine a masked value $M_j(T_j)$ by applying a data masking algorithm to the tweak block value T;
- m+1 storage units 84-$j$, for j=0, . . . , m, the $j^{th}$ storage unit 84-$j$ being configured to store the masked value $M_j(T_j)$;
- m+1 first XOR units 85-$j$ for j=0, . . . , m, the $j^{th}$ first XOR unit 85-$j$ being configured to determine an intermediate plaintext block $IP_j$ according to equation (3);
- m+1 block cipher encryption units 86-$j$ for j=0, . . . , m, the $j^{th}$ being configured to determine an intermediate ciphertext block $IC_j$ by encrypting the intermediate plaintext block $IP_j$ using a block cipher $\mathcal{C}$ according to equation (4);
- m+1 second XOR units 87-$j$ for j=0, . . . , m, the $j^{th}$ second XOR unit 87-$j$ being configured to determine a ciphertext block $C_j$ according to equation (5);
- m+1 second masking units 111-$j$ for j=0, . . . , m, the $j^{th}$ second masking unit 111-$j$ being configured to apply a data masking algorithm to the masked value determined by the first masking unit 83-$j$;
- m+1 third masking units 113-$j$ for j=0, . . . , m, the $j^{th}$ third masking unit 113-$j$ being configured to apply a data masking algorithm to the intermediate plaintext block $IP_j$ before encryption by the block cipher encryption unit 86-$j$, and
- m+1 fourth masking units 115-$j$ for j=0, . . . , m, the $j^{th}$ fourth masking unit 115-$j$ being configured to apply a data masking algorithm to the ciphertext block determined by the second XOR unit 87-$j$, thereby providing the final ciphertext block $C_j$.

In the third variant, the data masking algorithm applied by the first masking units 83-$j$, the second masking units 111-$j$, the third masking unit 113-$j$, and the fourth masking units 115-$j$, for j=0, . . . , m, may be an additive masking algorithm using a predefined mask value $m_j$ in association with each plaintext block P for j=0, . . . , m, each predefined mask value $m_j$ being selected from a set of predefined mask values.

In some embodiments using the third variant, the block cipher $\mathcal{C}$ may implement a block cipher masking algorithm.

In other embodiments, the block cipher $\mathcal{C}$ may not implement masking countermeasures.

Figure 17:
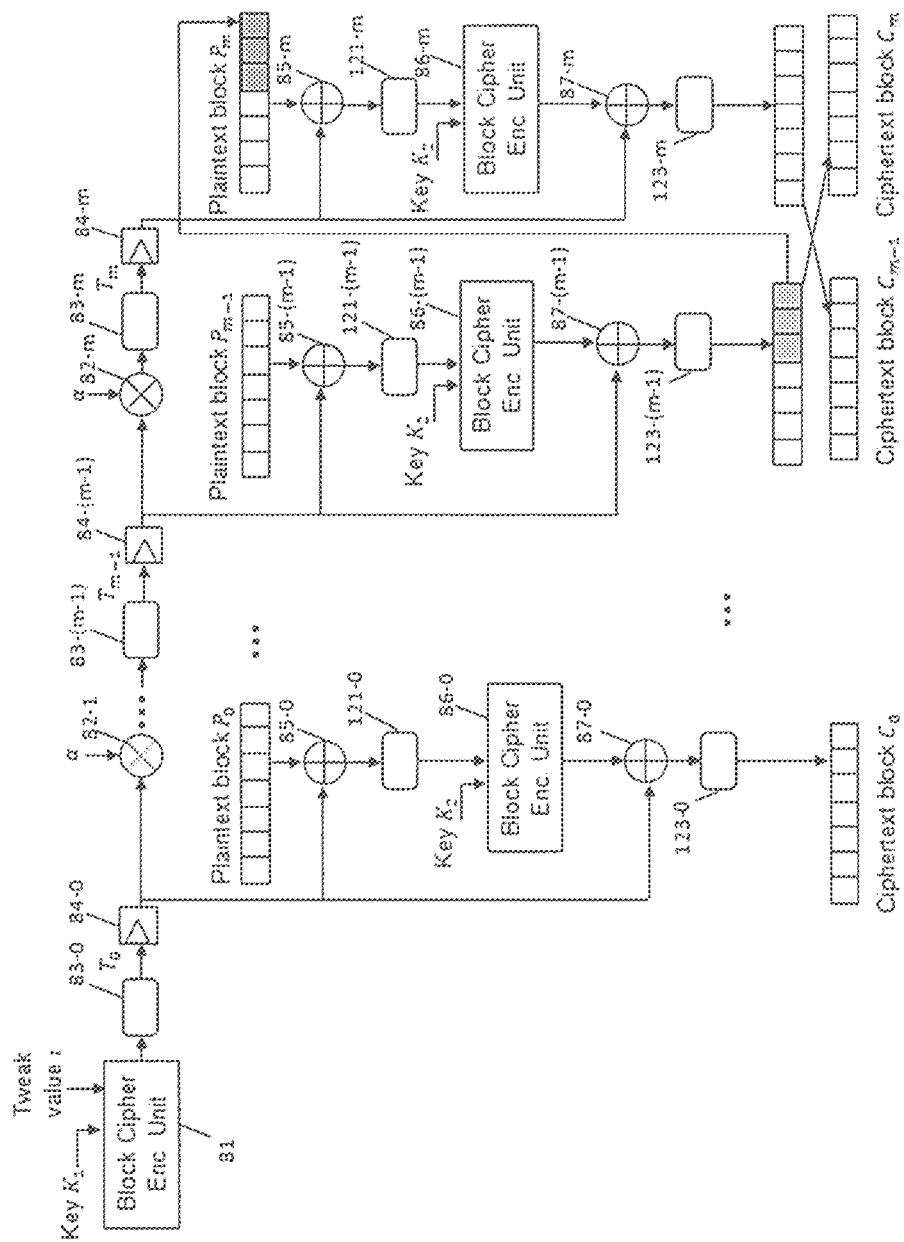
FIG. 17 is a block diagram of an encryption device implementing the XTS mode of operation according to an embodiment.

FIG. 17 is a block diagram illustrating a block cipher encryption device configured to encrypt a data unit plaintext $P=(P_0, \ldots, P_m)$ comprising m+1 plaintext blocks according to some embodiments which use the fourth variant of single block encryption to encrypt each of the m+1 plaintext blocks according to the XTS mode of operation.

In such embodiments, the block cipher encryption device comprises:
- a tweak encryption unit 81 configured to determine an encrypted tweak value $E\mathcal{C}_{K_T}(i)$ by encrypting the tweak value i using a block cipher $\mathcal{C}$ and a tweak encryption key $K_T$;
- m+1 combinatorial function units 82-$j$ for j=0, . . . , m, the $j^{th}$ combinatorial function unit 82-$j$ being configured to determine a tweak block value $T_j$ by applying a combinatorial function (e.g. a modular multiplication) between a value derived from the tweak value (e.g. the encrypted tweak block $E\mathcal{C}_{K_T}(i)$) and the primitive element α. It should be noted that the first combinatorial function unit 82-0 is not illustrated for simplification reasons, since for the first plaintext block, the block index j=0, thus $T_0 = E\mathcal{C}_{K_T}(i)$;
- m+1 first masking units 83-$j$ for j=0, . . . , m, the $j^{th}$ first masking unit 83-$j$ being configured to determine a masked value $M_j(T_j)$ by applying a data masking algorithm to the tweak block value T;
- m+1 storage units 84-$j$, for j=0, . . . , m, the $j^{th}$ storage unit 84-$j$ being configured to store the masked value $M_j(T_j)$;
- m+1 first XOR units 85-$j$ for j=0, . . . , m, the $j^{th}$ first XOR unit 85-$j$ being configured to determine an intermediate plaintext block $IP_j$ according to equation (3);
- m+1 block cipher encryption units 86-$j$ for j=0, . . . , m, the $j^{th}$ being configured to determine an intermediate ciphertext block $IC_j$ by encrypting the intermediate plaintext block $IP_j$ using a block cipher $\mathcal{C}$ according to equation (4);
- m+1 second XOR units 87-$j$ for j=0, . . . , m, the $j^{th}$ second XOR unit 87-$j$ being configured to determine a ciphertext block $C_j$ according to equation (5);
- m+1 second masking units 121-$j$ for j=0, . . . , m, the $j^{th}$ second masking unit 121-$j$ being configured to apply a data masking algorithm to the intermediate plaintext block $IP_j$ before encryption by the block cipher encryption unit 86-$j$, and
- m+1 third masking units 123-$j$ for j=0, . . . , m, the $j^{th}$ third masking unit 123-$j$ being configured to apply a data masking algorithm to the ciphertext block determined by the second XOR unit 87-$j$, thereby providing the final ciphertext block $C_j$.

According to some embodiments, the data masking algorithm applied by the first masking units 83-$j$, the second masking units 121-$j$, and the third masking unit 123-$j$, for j=0, . . . , m, may be an additive masking algorithm using an affine function of a predefined mask value selected from a set of predefined mask values, the affine function being represented by a slope coefficient and a constant value, the slope coefficient being a predefined primitive element α over a given finite field (e.g. $GF(2^l)$, the constant value being a predefined mask value selected from a predefined set of mask values.

In some embodiments using the fourth variant, the block cipher $\mathcal{C}$ may implement a block cipher masking algorithm.

In other embodiments, the block cipher $\mathcal{C}$ may not implement masking countermeasures.

Figure 18:
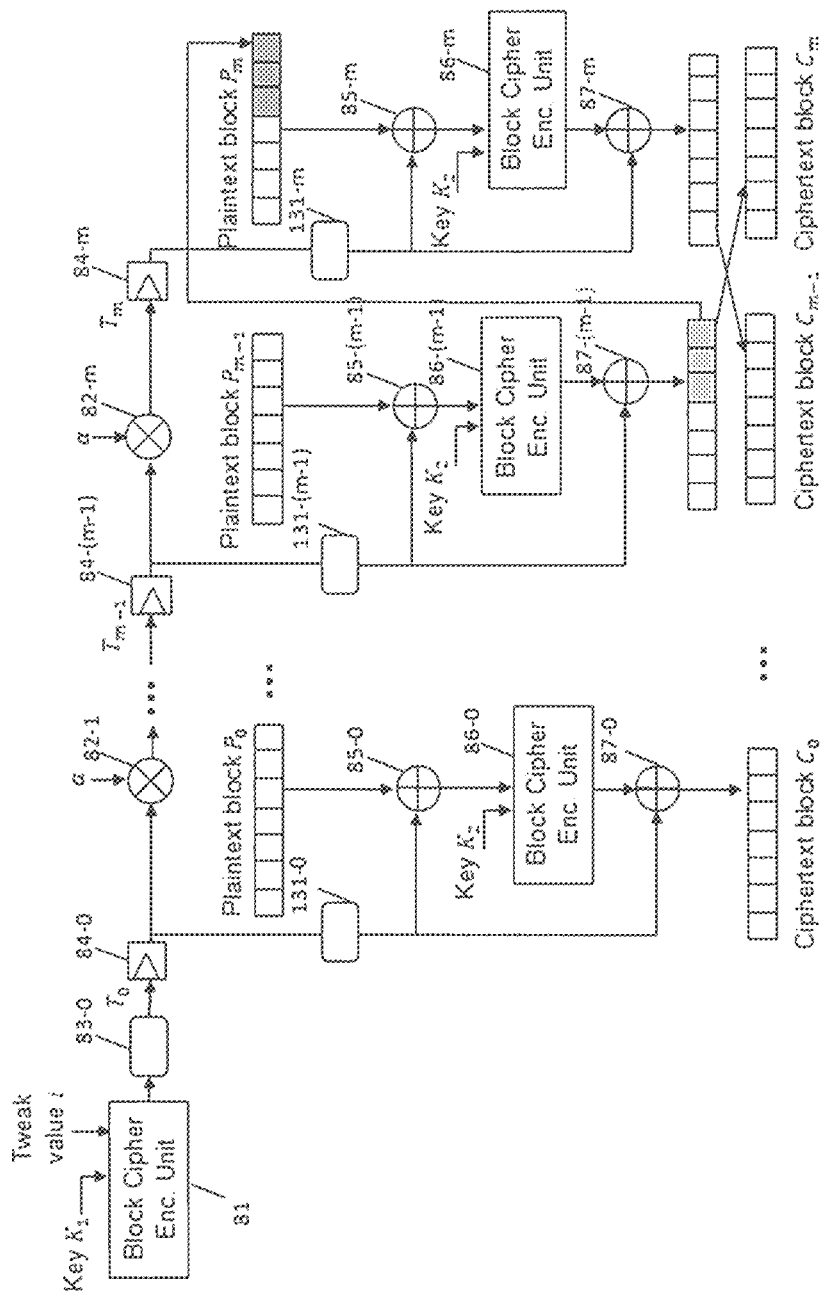
FIG. 18 is a block diagram of an encryption device implementing the XTS mode of operation according to an embodiment in which a multiplicative masking algorithm is used.

FIG. 18 is a block diagram illustrating a block cipher encryption device configured to encrypt a data unit plaintext $P=(P_0, \ldots, P_m)$ comprising m+1 plaintext blocks according to some embodiments which use the fifth variant of single block encryption to encrypt each of the m+1 plaintext blocks according to the XTS mode of operation.

In such embodiments, the block cipher encryption device comprises:
- a tweak encryption unit 81 configured to determine an encrypted tweak value $E\mathcal{C}_{,K_T}(i)$ by encrypting the tweak value i using a block cipher $\mathcal{C}$ and a tweak encryption key $K_T$;
- m+1 combinatorial function units 82-$j$ for j=0, ..., m, the $j^{th}$ combinatorial function unit 82-$j$ being configured to determine a tweak block value $T_j$ by applying a combinatorial function to a value derived from the tweak value (e.g. the encrypted tweak block $E\mathcal{C}_{,K_T}(i)$) and the primitive element a. It should be noted that the first combinatorial function unit 82-0 is not illustrated for simplification reasons, since for the first plaintext block, the block index j=0, thus $T_0=E\mathcal{C}_{,K_T}(i)$;
- m+1 first masking units 83-$j$ for j=0, ..., m, the $j^{th}$ first masking unit 83-$j$ being configured to determine a masked value $M_j(T_j)$ by applying a data masking algorithm to the tweak block value T;
- m+1 storage units 84-$j$, for j=0, ..., m, the $j^{th}$ storage unit 84-$j$ being configured to store the masked value $M_j(T_j)$;
- m+1 first XOR units 85-$j$ for j=0, ..., m, the $j^{th}$ first XOR unit 85-$j$ being configured to determine an intermediate plaintext block $IP_j$ according to equation (3);
- m+1 block cipher encryption units 86-$j$ for j=0, ..., m, the $j^{th}$ being configured to determine an intermediate ciphertext block $IC_j$ by encrypting the intermediate plaintext block $IP_j$ using a block cipher $\mathcal{C}$ according to equation (4), and
- m+1 second masking units 131-$j$ for j=0, ..., m, the $j^{th}$ second masking unit 131-$j$ being configured to apply a data masking algorithm to the masked value $M_j(T_j)$ determined by the first masking unit 83-$j$ and stored in the storage unit 84-$j$.

According to the fifth variant, the data masking algorithm applied in the first masking units 83-$j$ and the second masking units 131-$j$, for j=0, ..., m, may be multiplicative masking using predefined invertible mask values, a predefined invertible mask value being associated with each plaintext block.

In some embodiments using the fifth variant, the block cipher $\mathcal{C}$ may implement a block cipher masking algorithm.

In other embodiments, the block cipher $\mathcal{C}$ may not implement masking countermeasures.

There is also provided a block cipher decryption device for decrypting a data unit ciphertext C into blocks of plaintexts $P_j$ for j=0, ..., m, the data unit ciphertext being previously encrypted using the block cipher encryption device according to any of the preceding features using tweakable block ciphers based on tweakable modes of operation. The data unit ciphertext $C=(C_0|C_1, ..., |C_m)$ is assigned a tweak value i and is divided into (m+1; m+1≥1) one or more ciphertext blocks $C_j$ for j=0, ..., m. Each ciphertext block is assigned a block index j.

Figure 19:
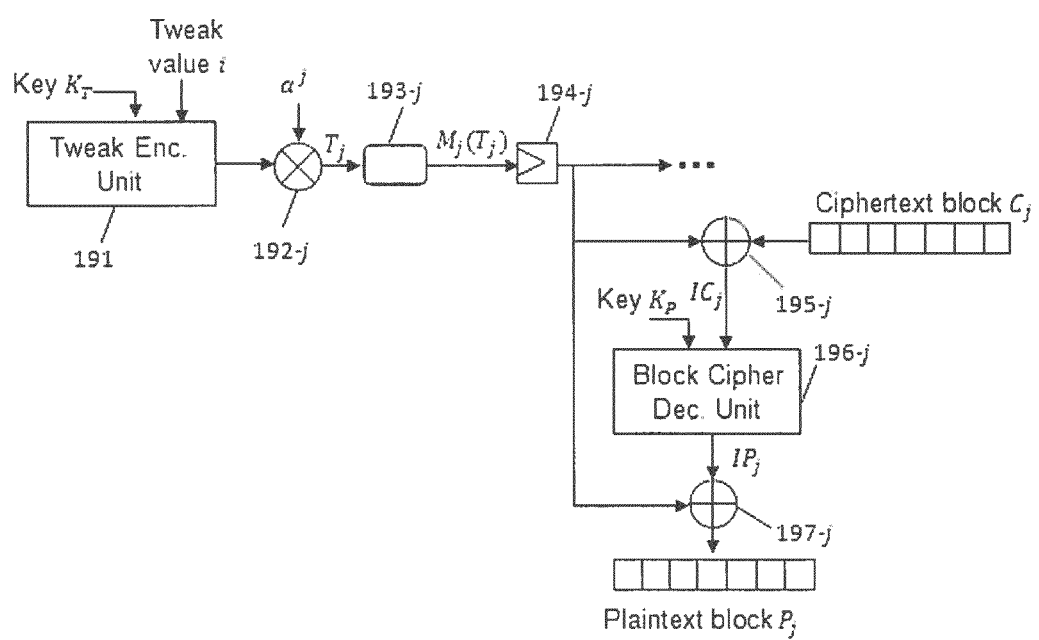
FIG. 19 is a block diagram of a cipher's block decryption according to some embodiments.

FIG. 19 is a block diagram illustrating the structure of the processing unit associated to the decryption of a single ciphertext block. As shown in FIG. 19, the block cipher decryption device comprises:
- a tweak encryption unit 191 configured to determine an encrypted tweak value $E\mathcal{C}_{,K_T}(i)$ by encrypting the tweak value i using a block cipher $\mathcal{C}$ and a tweak encryption key $K_T$;
- a combinatorial function unit 192-$j$ associated with each ciphertext block $C_j$ for j=0, ..., m, the $j^{th}$ combinatorial function unit 192-$j$ being configured to determine a tweak block value $T_j$ by applying a combinatorial function to a value derived from the tweak value (e.g. the encrypted tweak value $E\mathcal{C}_{,K_T}(i)$) and a function of a block index assigned to the ciphertext block $C_j$ according to equation (1).

The decryption of the data unit ciphertext relies on the use of masking countermeasures to protect data delivered by the combinatorial function units 192-$j$ for j=0, ..., m. More specifically, the block cipher decryption device may comprise, in association with each ciphertext block $C_j$:
- a masking unit 193-$j$ configured to determine a masked value $M_j(T_j)$ by applying a data masking algorithm to the tweak block $T_j$ determined by the combinatorial function unit 192-$j$ associated with the ciphertext block $C_j$;
- a storage unit 84-$j$ configured to store the masked value $M_j(T_j)$;
- a first XOR unit 195-$j$ configured to determine an intermediate ciphertext block $IC_j$ by applying the XOR operation between the masked value $M_j(T_j)$ and the ciphertext block $C_j$;
- a block cipher decryption unit 196-$j$ configured to determine an intermediate plaintext block $IP_j$ by decrypting the intermediate ciphertext block $IC_j$ using the block cipher $\mathcal{C}$ and a data decryption key $K_P$;
- a second XOR unit 197-$j$ configured to determine a plaintext block P by applying the XOR operation between the masked value $M_j(T_j)$ and the intermediate plaintext block $IP_j$.

The block cipher decryption device is configured to determine the data unit plaintext by performing a concatenation of the m+1 plaintext blocks $P_j$ such that $P=(P_0|P_1|, ..., |P_m)$.

Figure 20:
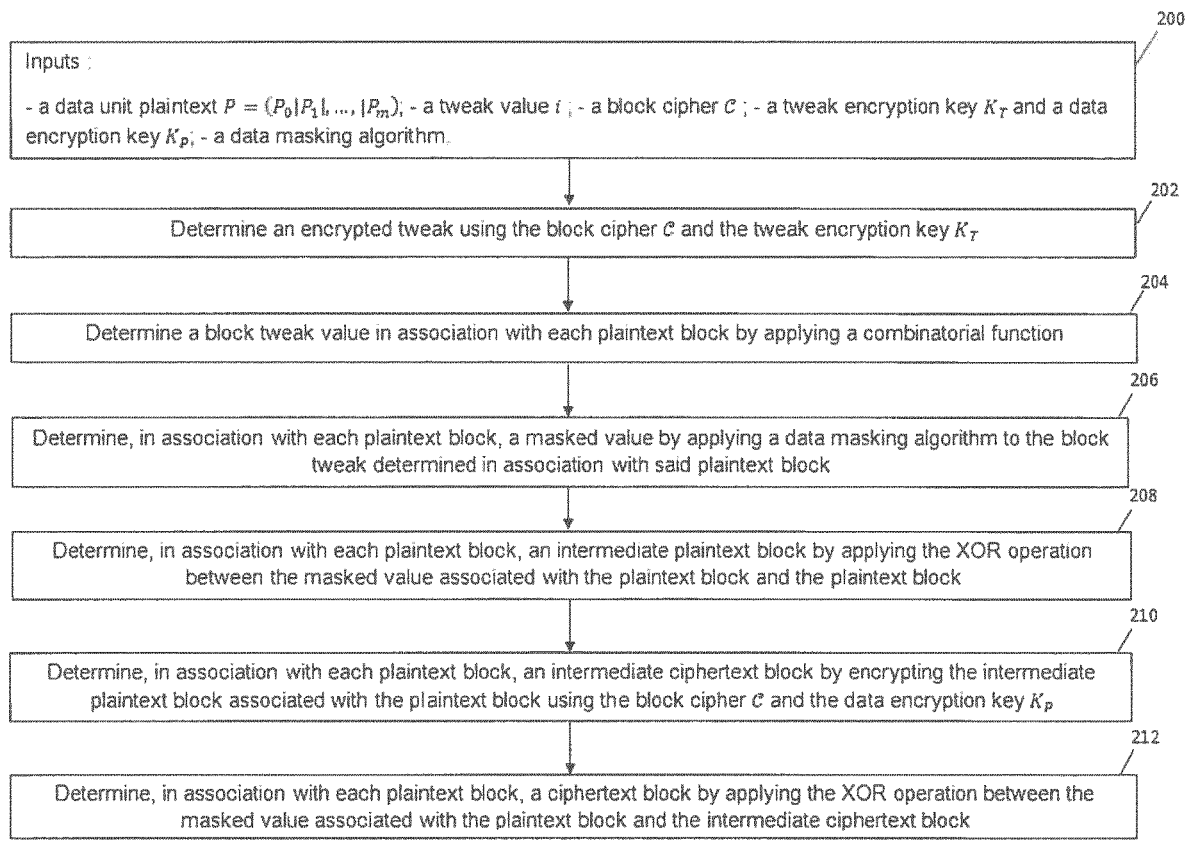
FIG. 20 is a flowchart depicting a method for encrypting a data unit plaintext using block ciphers based on tweakable modes of operation according to some embodiments.

Referring to FIG. 20, there is also provided a method for encrypting a data unit plaintext P into blocks of ciphertexts $C_j$ for j=0, ..., m, the data unit plaintext being assigned a tweak value i and being divided into (m+1≥1) one or more plaintext blocks $P_j$ for j=0, ..., m.

At step 200, inputs may be received comprising the data unit plaintext $P=(P_0|P_1|, ..., |P_m)$, the tweak value i, a block cipher $\mathcal{C}$, a tweak encryption key Kr, a data encryption key $K_P$, and a data masking algorithm.

At step 202, an encrypted tweak value $E\mathcal{C}_{,K_T}(i)$ may be determined by encrypting the tweak value i using the block cipher $\mathcal{C}$ and the tweak encryption key Kr.

At step 204, a tweak block value $T_j$ may be determined in association with each plaintext block $P_j$ for j=0, ..., m by applying a combinatorial function (e.g. a modular multiplication) to a value derived from the tweak value i and a function f(j) of the block index j assigned to the plaintext block P according to equation (1). The value derived from the tweak value may be given by the encrypted tweak value $E\mathcal{C}_{,K_T}(i)$.

At step 206, a masked value $M_j(T_j)$ may be determined in association with each plaintext block $P_j$ for j=0, ..., m by applying a data masking algorithm to the tweak block value $T_j$ determined in association with each plaintext block $P_j$.

At step 208, an intermediate plaintext block $IP_j$ may be determined in association with each plaintext block $P_j$ for j=0, ..., m by applying the XOR operation between the masked value $M_j(T_j)$ and the plaintext block P according to equation (3).

At step 210, an intermediate ciphertext block $IC_j$ may be determined in association with each plaintext block $P_j$ for j=0, ..., m by encrypting the intermediate plaintext block $IP_j$ associated with each plaintext block using the block cipher $\mathcal{C}$ and the data encryption key $K_P$ according to equation (4).

At step 212, a ciphertext block ($C_j$) may be determined in association with each plaintext block $P_j$ for j=0, ..., m by applying the XOR operation between the masked value $M_j(T_j)$ associated with each plaintext block and the intermediate ciphertext block $IC_j$ according to equation (5).

The method may further comprise determining a data unit ciphertext C by performing a concatenation of the m+1 ciphertext blocks $C_j$ such that $C=(C_0|C_1|, \ldots, |C_m)$.

The encryption method may use a tweakable mode of operation chosen in a group comprising the XEX mode of operation and the XTS mode of operation. Further, the method may implement additional masking countermeasures according to any of the preceding variants.

Figure 21:
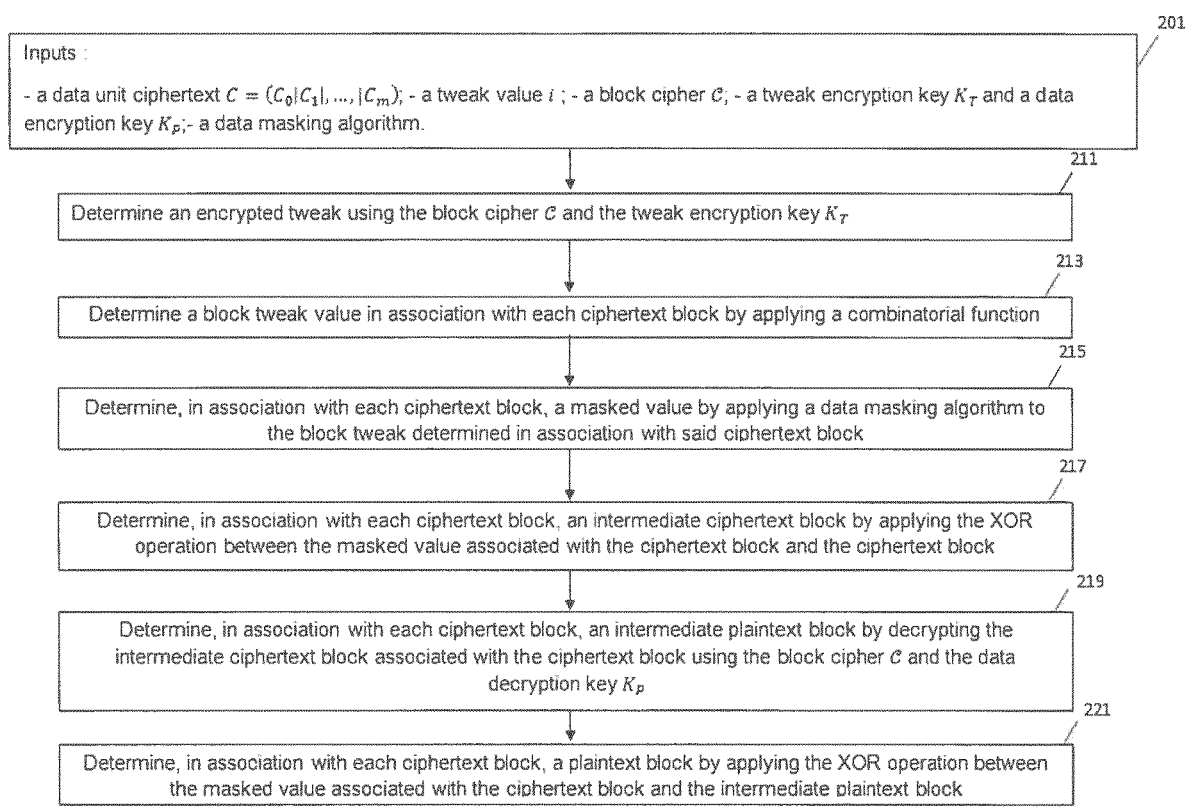
FIG. 21 is a flowchart depicting a method for decrypting a data unit ciphertext using block ciphers based on tweakable modes of operation, according to some embodiments.

Referring to FIG. 21, there is also provided a method for decrypting a data unit ciphertext C into blocks of plaintexts $P_j$ for j=0, ..., m, the data unit ciphertext being previously encrypted using the block cipher encryption method according to any of the preceding features using tweakable block ciphers based on tweakable modes of operation. The data unit ciphertext $C=(C_0|C_1|, \ldots |C_m)$ is assigned a tweak value i and is divided into (m+1; m+1≥1) one or more ciphertext blocks $C_j$ for j=0, ..., m. Each ciphertext block is assigned a block index j.

At step 210, inputs may be received comprising the data unit ciphertext $C=(C_0|C_1|, \ldots, |C_m)$, the tweak value i, a block cipher $\mathcal{C}$, a tweak encryption key $K_T$, a data encryption key $K_P$, and a masking algorithm.

At step 211, an encrypted tweak value $E\mathcal{C}_{K_T}(i)$ may be determined by encrypting the tweak value i using the block cipher $\mathcal{C}$ and the tweak encryption key $K_T$.

At step 213, a tweak block value $T_j$ may be determined in association with each ciphertext block $C_j$ for j=0, ..., m by applying a combinatorial function between a value derived from the tweak value i and a function $f(j)$ of the block index j assigned to the ciphertext block $C_j$ according to equation (1). The value derived from the tweak value may be equal to the encrypted tweak value $E\mathcal{C}_{K_T}(i)$.

At step 215, a masked value $M_j(T_j)$ may be determined in association with each ciphertext block $C_j$ for j=0, ..., m by applying a data masking algorithm to the tweak block value $T_j$ determined in association with each ciphertext block $C_j$.

At step 217, an intermediate ciphertext block $IC_j$ may be determined in association with each ciphertext block $C_j$ for j=0, ..., m by applying the XOR operation between the masked value $M_j(T_j)$ and the ciphertext block $C_j$.

At step 219, an intermediate plaintext block $IP_j$ may be determined in association with each ciphertext block $C_j$ for j=0, ..., m by decrypting the intermediate ciphertext block $IC_j$ associated with each ciphertext block using the block cipher $\mathcal{C}$ and the data decryption key $K_P$.

At step 221, a plaintext block P may be determined in association with each ciphertext block $C_j$ for j=0, ..., m by applying the XOR operation between the masked value $M_j(T_j)$ associated with each ciphertext block and the intermediate plaintext block $IP_j$.

The method may further comprise determining a data unit plaintext P by the concatenation of the m+1 plaintext blocks $P_j$ such that $P=(P_0|P_1|, \ldots, |P_m)$.

While embodiments of the invention have been illustrated by a description of various examples, and while these embodiments have been described in considerable details, it is not the intent of the applicant to restrict or in any way limit the scope of the appended claims to such specification. Additional advantages and modifications will readily appear to those skilled in the art. The invention in its broader aspects is therefore not limited to the specific details, representative methods, and illustrative examples shown and described.

The invention claimed is:

1. A block cipher encryption device for encrypting a data unit plaintext into blocks of ciphertexts, said data unit plaintext being assigned a tweak value and being divided into one or more plaintext blocks, the block cipher encryption device comprising:
   a combinatorial function unit (82-j) associated with each plaintext block ($P_j$), said combinatorial function unit (82-j) being configured to determine a tweak block value ($T_j$) by applying a combinatorial function between a value derived from said tweak value and a function of a block index assigned to said plaintext block,
   wherein the block cipher encryption device, in association with each plaintext block ($P_j$), comprises:
   a first masking unit (83-j) configured to determine a masked value $M_j(T_j)$ by applying a data masking algorithm to the tweak block value ($T_j$) determined by the combinatorial function unit (82-j) associated with said plaintext block,
   wherein the block cipher encryption device further comprises:
   a tweak encryption unit configured to determine an encrypted tweak value by encrypting said tweak value using a block cipher and a tweak encryption key, said value derived from the tweak value being given by said encrypted tweak value;
   a first XOR unit (85-j) configured to determine an intermediate plaintext block ($IP_j$) by applying an XOR operation between said masked value $M_j(T_j)$ and said plaintext block ($P_j$);
   a block cipher encryption unit (86-j) configured to determine an intermediate ciphertext block ($IC_j$) by encrypting said intermediate plaintext block using said block cipher and a data encryption key;
   a second XOR unit (87-j) configured to determine a ciphertext block ($C_j$) by applying an XOR operation between said masked value $M_j(T_j)$ and said intermediate ciphertext block ($IC_j$).

2. The block cipher encryption device of claim 1, wherein said tweak block value ($T_j$) is determined by applying a combinatorial function between said encrypted tweak value and a function of a block index assigned to said plaintext block, said function being an exponentiation function represented by a base value and an exponent value, said base value being a primitive element over a given finite field, said exponent value being equal to said block index.

3. The block cipher encryption device of claim 1, wherein said data masking algorithm is an additive masking algorithm or a multiplicative masking algorithm.

4. The block cipher encryption device of claim 1, wherein said block cipher implements a block cipher masking algorithm, said block cipher masking algorithm being an additive masking algorithm or a multiplicative masking algorithm.

5. The block cipher encryption device of claim 1, wherein said block cipher applied by the block cipher encryption unit (86-j) implements an iterated additive block cipher masking algorithm that performs several masking iterations, a mask value being used at each masking iteration, said first masking unit (83-j) being configured to apply a data masking algorithm that uses as a mask value the mask value implemented by said block cipher encryption unit (86-j) at the last masking iteration, the block cipher encryption device comprising, in association with each plaintext block ($P_j$):

a second masking unit (98-*j*) configured to apply said data masking algorithm to the masked value determined by said first masking unit (83-*j*), and a third masking unit (99-*j*) configured to apply said data masking algorithm to said intermediate plaintext block ($IP_j$) before being encrypted by said block cipher encryption unit (86-*j*).

6. The block cipher encryption device of claim 1, wherein said block cipher applied by the block cipher encryption unit (86-*j*) implements an iterated additive block cipher masking algorithm that performs several masking iterations, a mask value being used at each masking iteration, said first masking unit (83-*j*) being configured to apply a data masking algorithm that uses, as a mask value, an affine function of the mask value implemented by said block cipher encryption unit (86-*j*) at the last masking iteration, the block cipher encryption device comprising, in association with each plaintext block ($P_j$):

a second masking unit (109-*j*) configured to apply said data masking algorithm to said intermediate plaintext block ($IP_j$) before being encrypted by said block cipher encryption unit (86-*j*);

said affine function being represented by a slope coefficient and a constant value, said slope coefficient being a predefined primitive element over a given finite field, said constant value corresponding to the mask value implemented by the block cipher encryption unit (86-*j*) at the last masking iteration of the iterated additive block cipher masking algorithm.

7. The block cipher encryption device of claim 1, wherein the block cipher encryption device comprises, in association with each plaintext block ($P_j$):

a second masking unit (111-*j*) configured to apply said data masking algorithm to the masked value determined by said first masking unit (83-*j*) and corresponding to the mask value implemented by the block cipher encryption unit (86-*j*) and (86-*j*+1), and a third masking unit (113-*j*) configured to apply said data masking algorithm to said intermediate plaintext block ($IP_j$) before being encrypted by said block cipher encryption unit (86-*j*);

a fourth masking unit (115-*j*) configured to apply said data masking algorithm to said ciphertext block determined by the second XOR unit (87-*j*);

said data masking algorithm being an additive masking algorithm using a predefined mask value selected from a set of predefined mask values.

8. The block cipher encryption device of claim 1, wherein the block cipher encryption device comprises, in association with each plaintext block ($P_j$):

a second masking unit (121-*j*) configured to apply said data masking algorithm to said intermediate plaintext block ($IP_j$) before being encrypted by said block cipher encryption unit (86-*j*);

a third masking unit (123-*j*) configured to apply said data masking algorithm to said ciphertext block determined by the second XOR unit (87-*j*);

said masking algorithm being an additive masking algorithm using an affine function of a predefined mask value, said affine function being represented by a slope coefficient and a constant value, said slope coefficient being a predefined primitive element over a given finite field, said constant value being a predefined mask value selected from a predefined set of predefined mask values.

9. The block cipher encryption device of claim 1, wherein the block cipher encryption device comprises, in association with each plaintext block ($P_j$), a second masking unit (131-*j*) configured to apply said data masking algorithm to the masked value determined by said first masking unit (83-*j*), said data masking algorithm being a multiplicative masking using predefined invertible mask values.

10. The block cipher encryption device of claim 1, wherein said block cipher is chosen in a group comprising the AES block cipher, the DES block cipher, the TDEA block cipher, the SEED block cipher, the SM4 block cipher, Camellia block cipher, the Blowfish block cipher, the Simon block cipher, the IDEA block cipher, and the RC5.

11. The block cipher encryption device of claim 1, wherein the block cipher encryption device is configured to encrypt said data unit plaintext according to a tweakable mode of operation chosen in a group comprising the XEX mode of operation and the XTS mode of operation.

12. A block cipher decryption device for decrypting a data unit ciphertext into blocks of plaintexts, said data unit ciphertext being previously encrypted using the block cipher encryption device according to claim 1, said data unit ciphertext being assigned a tweak value and being divided into one or more ciphertext blocks, the block cipher decryption device comprising:

a combinatorial function unit (192-*j*) associated with each ciphertext block ($C_j$), said combinatorial function unit (192-*j*) being configured to determine a tweak block value ($T_j$) by applying a combinatorial function between a value derived from said tweak value and a function of a block index assigned to said plaintext block, wherein the block cipher decryption device, in association with each ciphertext block ($C_j$), comprises:

a masking unit (193-*j*) configured to determine a masked value $M_j(T_j)$ by applying a data masking algorithm to the tweak block value ($T_j$) determined by the combinatorial function unit (192-*j*) associated with said ciphertext block, wherein the block cipher decryption device further comprises:

a tweak encryption unit (191) configured to determine an encrypted tweak value by encrypting said tweak value using a block cipher and a tweak encryption key, said value derived from the tweak value being equal to said encrypted tweak value;

a first XOR unit (195-*j*) configured to determine an intermediate ciphertext block ($IC_j$) by applying an XOR operation between said masked value $M_j(T_j)$ and said ciphertext block $C_j$;

a block cipher decryption unit (196-*j*) configured to determine an intermediate intermediate plaintext block $IP_j$ by decrypting said intermediate ciphertext block $IC_j$ using said block cipher and a data decryption key;

a second XOR unit (197-*j*) configured to determine a plaintext block ($P_j$) by applying an XOR operation between said masked value $M_j(T_j)$ and said intermediate plaintext block ($IP_j$).

13. A method for encrypting a data unit plaintext into blocks of ciphertexts, said data unit plaintext being assigned a tweak value and being divided into one or more plaintext blocks, the method comprising:

determining a tweak block value ($T_j$) in association with each plaintext block by applying a combinatorial function between a value derived from said tweak value and a function of a block index assigned to said plaintext block, wherein the method comprises, in association with each plaintext block ($P_j$), determining a masked value $M_j(T_j)$ by applying a data masking algorithm to the tweak block value ($T_j$) determined in association with said plaintext block, wherein the method further comprises:

determining (202) an encrypted tweak value by encrypting said tweak value using a block cipher and a tweak encryption key, said value derived from the tweak value being equal to said encrypted tweak value;

determining (208) an intermediate plaintext block ($IP_j$) by applying an XOR operation between said masked value $M_j(T_j)$ and said plaintext block ($P_j$);

determining (210) an intermediate ciphertext block ($IC_j$) by encrypting said intermediate plaintext block using said block cipher and a data encryption key;

determining (212) a ciphertext block ($C_j$) by applying an XOR operation between said masked value $M_j(T_j)$ and said intermediate ciphertext block ($IC_j$).

14. A method for decrypting a data unit ciphertext into blocks of plaintexts, said data unit ciphertext being assigned a tweak value and being divided into one or more ciphertext blocks, the decryption method comprising:

determining a tweak block value ($T_j$) in association with each ciphertext block ($C_j$) by applying a combinatorial function between a value derived from said tweak value and a function of a block index assigned to said ciphertext block, wherein the method comprises, in association with each ciphertext block ($C_j$), determining a masked value $M_j(T_j)$ by applying a data masking algorithm to the tweak block value ($T_j$) determined in association with said ciphertext block, wherein the method further comprises:

determining (213) an encrypted tweak value by encrypting said tweak value using a block cipher and a tweak encryption key, said value derived from the tweak value being equal to said encrypted tweak value;

determining (217) an intermediate ciphertext block ($IC_j$) by applying an XOR operation between said masked value $M_j(T_j)$ and said ciphertext block ($IC_j$);

determining (219) an intermediate plaintext block ($IP_j$) by decrypting said intermediate ciphertext block ($IC_j$) using said block cipher and a data decryption key;

determining (221) a plaintext block ($P_j$) by applying an XOR operation between said masked value $M_j(T_j)$ and said intermediate plaintext block ($IP_j$).

\* \* \* \* \*

UNITED STATES PATENT AND TRADEMARK OFFICE
CERTIFICATE OF CORRECTION

| | |
|---|---|
| PATENT NO. | : 11,689,353 B2 |
| APPLICATION NO. | : 17/251154 |
| DATED | : June 27, 2023 |
| INVENTOR(S) | : Théophile Boue et al. |

It is certified that error appears in the above-identified patent and that said Letters Patent is hereby corrected as shown below:

In the Claims

In Claim 12, Column 26, Line 52, "an intermediate intermediate plaintext block" should be -- an intermediate plaintext block --.

Signed and Sealed this
Twenty-second Day of August, 2023

Katherine Kelly Vidal
*Director of the United States Patent and Trademark Office*